US012483126B2

(12) United States Patent
Yu et al.

(10) Patent No.: US 12,483,126 B2
(45) Date of Patent: Nov. 25, 2025

(54) RESONANT SWITCHED CAPACITOR CONVERTER AND CONTROL METHOD THEREOF

(71) Applicant: Huawei Digital Power Technologies Co., Ltd., Shenzhen (CN)

(72) Inventors: Xinyu Yu, Shanghai (CN); Yunfeng Liu, Shanghai (CN); Kai Xin, Shanghai (CN); Fuqiang Xu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 203 days.

(21) Appl. No.: 18/517,117

(22) Filed: Nov. 22, 2023

(65) Prior Publication Data
US 2024/0088785 A1    Mar. 14, 2024

Related U.S. Application Data

(63) Continuation of application No. PCT/CN2022/094649, filed on May 24, 2022.

(30) Foreign Application Priority Data

May 25, 2021 (CN) .......................... 202110573323.X

(51) Int. Cl.
*H02M 3/07* (2006.01)
*H02J 3/38* (2006.01)
(Continued)

(52) U.S. Cl.
CPC .............. *H02M 3/07* (2013.01); *H02J 3/381* (2013.01); *H02M 7/487* (2013.01); *H02M 7/493* (2013.01);
(Continued)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

2013/0163302 A1* 6/2013 Li .............................. G05F 3/08
                                                                    323/311
2014/0327420 A1 11/2014 Lee et al.
(Continued)

FOREIGN PATENT DOCUMENTS

CN    107482914 A    12/2017
CN    109361314 A    2/2019
(Continued)

OTHER PUBLICATIONS

Tiyangyang Jiang et al.:"PWAM control of bidirectional LLC resonant converter", 2013 1st International Future Energy Electronic Conference (IFEEC), IEEE, Nov. 3, 2013, p. 827-832, XP032531775, DOI:10.1109/IFEEC.2013.6687616 (Year: 2013).*
(Continued)

*Primary Examiner* — Sean Kayes
*Assistant Examiner* — Nusrat Quddus
(74) *Attorney, Agent, or Firm* — Maier & Maier, PLLC

(57) ABSTRACT

The embodiments provide an RSCC and a control method thereof. The RSCC includes an input capacitor, an output capacitor, N parallel RSC branches, and a controller. The controller is configured to: determine an average value of characteristic currents of N resonance units; and reduce a duty cycle of a control signal of a charging switch in a first switch unit when determining that a characteristic current of a first resonance unit is greater than the average value, where a corresponding branch is in a charging stage when the charging switch is turned on; or reduce a duty cycle of a control signal of a discharging switch in a first switch unit
(Continued)

when determining that a characteristic current of a first resonance unit is less than the average value, where a corresponding branch is in a discharging stage when the discharging switch is turned on.

17 Claims, 9 Drawing Sheets

(51) Int. Cl.
  *H02M 1/00* (2007.01)
  *H02M 7/487* (2007.01)
  *H02M 7/493* (2007.01)
  *H02M 1/32* (2007.01)
(52) U.S. Cl.
  CPC ........ *H02J 2300/26* (2020.01); *H02M 1/0054* (2021.05); *H02M 1/32* (2013.01)
(58) Field of Classification Search
  CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/073; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/04; H02M 7/00; H02M 3/07; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 7/519; H02M 7/523; H02M 7/75; H02M 7/7575; H02M 7/66; H02M 7/68; H02M 7/72; H02M 7/483; H02M 2007/4835; H02M 1/08; H02M 1/084; H02M 1/0845; H02M 7/525; H02M 7/527; H02M 7/529; H02M 1/32; H02M 2001/322; H02M 2001/327; H02M 1/34; H02M 2001/342; H02M 2001/344; H02M 2001/346; H02M 2001/348; H02M 1/36; H02M 1/38; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 7/4837; H02M 3/01; H02M 1/0095; H02M 1/0054; H05B 39/048; B23K 11/24; H04B 2215/069; H02J 3/381
  See application file for complete search history.

(56) References Cited

U.S. PATENT DOCUMENTS

| | | |
|---|---|---|
| 2018/0091059 A1 | 3/2018 | Nene |
| 2020/0212806 A1* | 7/2020 | Levi .................... H02M 7/4833 |
| 2022/0021312 A1* | 1/2022 | Hirokawa ......... H02M 3/33571 |
| 2023/0318464 A1* | 10/2023 | Yu ........................ H02M 3/335 |
| | | 363/13 |

FOREIGN PATENT DOCUMENTS

| | | |
|---|---|---|
| CN | 113452248 A | 9/2021 |
| EP | 2709257 A2 | 3/2014 |

OTHER PUBLICATIONS

Yingying et al: "Design of a high-frequency isolated DTHB CLLC bidirectional resonant DC-DC converter" 2014 IEEE Conference and Expo Transportation Electrification Asia-Pacific (ITEC Asia-Pacific), IEEE, Aug. 31, 2014 (Aug. 31, 2014), p. 1-6, XP03267157, DOW:10.1109/ITEC-ap.2014.6941091 (Year: 2014).*

* cited by examiner

RESONANT SWITCHED CAPACITOR CONVERTER AND CONTROL METHOD THEREOF

CROSS-REFERENCE TO RELATED APPLICATIONS

This application is a continuation of International Application No. PCT/CN2022/094649, filed on May 24, 2022, which claims priority to Chinese Patent Application No. 202110573323.X, filed on May 25, 2021. The disclosures of the aforementioned applications are hereby incorporated by reference in their entireties.

TECHNICAL FIELD

The embodiments relate to the circuit field and to a resonant switched capacitor converter and a control method thereof.

BACKGROUND

With respect to photovoltaic power generation, electric vehicles, and a renewable energy systems have more requirements for a power electronic converter. Most conventional direct current converters transfer energy by using a magnetic element, for example, an inductor or a transformer, and have a large volume and a low power density. In addition, most of these converters work in a hard switching state, and have a high switching loss and low efficiency.

Compared with a conventional switched capacitor converter, a resonant switched capacitor converter (RSCC) transfers energy by using a resonance unit (a resonant inductor and a resonant capacitor), to reduce a volume of the converter. In addition, both a charging capacitor and a discharging capacitor of the resonant switched capacitor converter work in a resonant state. Therefore, a current spike problem does not occur, and the resonant switched capacitor converter may be applied to a scenario in which an output current is large.

When the RSCC includes a plurality of parallel branches, a conversion power of the RSCC may be increased. However, due to different circuit parameters, currents of the branches in the RSCC may be not uniform, affecting a stress and a loss of a power switch device in the RSCC.

SUMMARY

The embodiments include a resonant switched capacitor converter (RSCC) and a control method thereof to make currents of parallel branches in the RSCC uniform, so that a stress and a loss of a switch of each branch are uniform.

According to a first aspect, a resonant switched capacitor converter is provided, including: an input capacitor and an output capacitor; N parallel resonant switched capacitor branches, where each of the N resonant switched capacitor branches includes a switch unit and a resonance unit; and a controller, where the controller is configured to control an on state of a switch in the switch unit, so that the resonance unit obtains electric energy from the input capacitor in a charging stage, and the resonance unit outputs the electric energy to the output capacitor in a discharging stage. The controller is further configured to: determine an average value of characteristic currents of N resonance units, where the N resonance units are in a one-to-one correspondence with the N resonant switched capacitor branches, and the characteristic current is a valid value or a peak value of an instantaneous current of the resonance unit in one resonant switching period; and reduce a duty cycle of a control signal of a charging switch in a first switch unit when determining that a characteristic current of a first resonance unit is greater than the average value, where a resonant switched capacitor branch corresponding to the charging switch is in a charging stage when the charging switch is turned on; or reduce a duty cycle of a control signal of a discharging switch in the first switch unit when determining that the characteristic current of the first resonance unit is less than the average value, where a resonant switched capacitor branch corresponding to the discharging switch is in a discharging stage when the discharging switch is turned on. The first resonance unit is any one of the N resonance units, and the first switch unit is a switch unit in a resonant switched capacitor branch in which the first resonance unit is located, where N is an integer greater than 1.

In an embodiment, the controller may determine a valid value or a peak value of an instantaneous current flowing through each of the N resonance units in one resonant switching period. The valid value or the peak value may also be referred to as a characteristic current, and an average value of N characteristic currents is further calculated. The average value may be understood as a standard current withstood by each resonance unit. When it is determined that the characteristic current of the first resonance unit is greater than the average value, it indicates that a current withstood by a switch in the first switch unit is greater than the standard current, and the controller may be configured to reduce the duty cycle of the control signal of the charging switch. In this manner, a time period in which a branch in which the first resonance unit is located is in a charging stage is reduced, and the characteristic current of the first resonance unit is reduced in a next resonant switching period, so that a stress and a loss withstood by the switch in the first switch unit are reduced. When it is determined that the characteristic current of the first resonance unit is less than the average value, it indicates that a current flowing through a switch in the first switch unit is less than the standard current, and the controller may be configured to reduce the duty cycle of the control signal of the discharging switch. In this manner, a time period in which a branch in which the first resonance unit is located is in a discharging stage is reduced, and the characteristic current of the first resonance unit is increased in a next resonant switching period, so that a stress and a loss withstood by the switch in the first switch unit tend to be uniform.

Therefore, the RSCC provided can make currents of parallel branches in the RSCC uniform, so that a stress and a loss of a switch of each branch are uniform, to prevent a circuit fault caused by a too high stress and loss withstood by a switch in some branches.

With reference to the first aspect, in a possible implementation, the controller is configured to: reduce the duty cycle of the control signal of the charging switch when determining that the characteristic current of the first resonance unit is greater than the average value and a difference between the characteristic current of the first resonance unit and the average value is greater than a first threshold; or reduce the duty cycle of the control signal of the discharging switch when determining that the characteristic current of the first resonance unit is less than the average value and a difference between the characteristic current of the first resonance unit and the average value is greater than a second threshold.

With reference to the first aspect, in a possible implementation, the controller is configured to: detect instantaneous currents of the N resonance units; determine the characteristic currents of the N resonance units based on the instantaneous currents of the N resonance units; and calculate the average value based on the characteristic currents of the N resonance units.

With reference to the first aspect, in a possible implementation, the controller includes a sampling unit and a control unit; the sampling unit is configured to: collect instantaneous current information of the N resonance units, and send the instantaneous current information of the N resonance units to the control unit; and the control unit is configured to: receive the instantaneous current information of the N resonance units; determine the characteristic currents of the N resonance units based on the instantaneous current information of the N resonance units; and calculate the average value based on the characteristic currents of the N resonance units.

With reference to the first aspect, in a possible implementation, the resonant switched capacitor converter is a two-level resonant switched capacitor converter, the resonance unit includes a resonant capacitor and a resonant inductor that are connected in series, the switch unit includes a first switch and a second switch, the first switch is the charging switch, the second switch is the discharging switch, and each of the N resonant switched capacitor branches further includes a first diode and a second diode; a first terminal of the first switch is connected to a first terminal of the input capacitor, a second terminal of the first switch is connected to a first terminal of the second switch and a first terminal of the resonance unit, and a second terminal of the second switch is connected to a second terminal of the input capacitor; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

With reference to the first aspect, in a possible implementation, the resonant switched capacitor converter is a neutral point clamped (NPC)-type three-level resonant switched capacitor converter, the resonance unit includes a resonant capacitor and a resonant inductor that are connected in series, the input capacitor includes a first capacitor and a second capacitor, the switch unit includes a first switch, a second switch, a third switch, and a fourth switch, the first switch is the charging switch, the fourth switch is the discharging switch, and each of the N resonant switched capacitor branches further includes a first diode, a second diode, a third diode, and a fourth diode; a first terminal of the first switch is connected to a first terminal of the first capacitor, a second terminal of the first switch is connected to a first terminal of the second switch and a cathode of the third diode, a second terminal of the second switch is connected to a first terminal of the third switch and a first terminal of the resonance unit, a second terminal of the third switch is connected to a first terminal of the fourth switch and an anode of the fourth diode, a second terminal of the fourth switch is connected to a second terminal of the second capacitor, a first terminal of the second capacitor is connected to a second terminal of the first capacitor, an anode of the third diode, and a cathode of the fourth diode; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

With reference to the first aspect, in a possible implementation, the resonant switched capacitor converter is an active neutral point clamped (ANPC)-type three-level resonant switched capacitor converter, the resonance unit includes a resonant capacitor and a resonant inductor that are connected in series, the input capacitor includes a first capacitor and a second capacitor, the switch unit includes a first switch, a second switch, a third switch, a fourth switch, a fifth switch, and a sixth switch, the first switch is the charging switch, the fourth switch is the discharging switch, and each of the N resonant switched capacitor branches further includes a first diode and a second diode; a first terminal of the first switch is connected to a first terminal of the first capacitor, a second terminal of the first switch is connected to a first terminal of the second switch and a first terminal of the fifth switch, a second terminal of the second switch is connected to a first terminal of the third switch and a first terminal of the resonance unit, a second terminal of the third switch is connected to a first terminal of the fourth switch and a second terminal of the sixth switch, a second terminal of the fourth switch is connected to a second terminal of the second capacitor, and a first terminal of the second capacitor is connected to a second terminal of the first capacitor, a second terminal of the fifth switch, and a first terminal of the sixth switch; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

According to a second aspect, a control method for a resonant switched capacitor converter is provided. The resonant switched capacitor converter includes: an input capacitor and an output capacitor; N parallel resonant switched capacitor branches, where each of the N resonant switched capacitor branches includes a switch unit and a resonance unit; and a controller, where the controller is configured to control an on state of a switch in the switch unit, so that the resonance unit obtains electric energy from the input capacitor in a charging stage, and the resonance unit outputs the electric energy to the output capacitor in a discharging stage. The method includes: the controller determines an average value of characteristic currents of N resonance units. The N resonance units are in a one-to-one correspondence with the N resonant switched capacitor branches, and the characteristic current is a valid value or a peak value of an instantaneous current of the resonance unit in one resonant switching period. The controller reduces a duty cycle of a control signal of a charging switch in a first switch unit when determining that a characteristic current of a first resonance unit is greater than the average value. A resonant switched capacitor branch corresponding to the charging switch is in a charging stage when the charging switch is turned on. Alternatively, the controller reduces a duty cycle of a control signal of a discharging switch in the first switch unit when determining that the characteristic current of the first resonance unit is less than the average value. A resonant switched capacitor branch corresponding to the discharging switch is in a discharging stage when the discharging switch is turned on. The first resonance unit is any one of the N resonance units, and the first switch unit is a switch unit in a resonant switched capacitor branch in which the first resonance unit is located, where N is an integer greater than 1.

In an embodiment, the controller may determine a valid value or a peak value of an instantaneous current flowing through each of the N resonance units in one resonant switching period. The valid value or the peak value may also be referred to as a characteristic current, and an average value of N characteristic currents is further calculated. The average value may be understood as a standard current withstood by each resonance unit. When it is determined that the characteristic current of the first resonance unit is greater than the average value, it indicates that a current withstood by a switch in the first switch unit is greater than the standard current, and the controller may be configured to reduce the duty cycle of the control signal of the charging switch. In this manner, a time period in which a branch in which the first resonance unit is located is in a charging stage is reduced, and the characteristic current of the first resonance unit is reduced in a next resonant switching period, so that a stress and a loss withstood by the switch in the first switch unit are reduced. When it is determined that the characteristic current of the first resonance unit is less than the average value, it indicates that a current flowing through a switch in the first switch unit is less than the standard current, and the controller may be configured to reduce the duty cycle of the control signal of the discharging switch. In this manner, a time period in which a branch in which the first resonance unit is located is in a discharging stage is reduced, and the characteristic current of the first resonance unit is increased in a next resonant switching period, so that a stress and a loss withstood by the switch in the first switch unit tend to be uniform.

Therefore, the RSCC provided can make currents of parallel branches in the RSCC uniform, so that a stress and a loss of a switch of each branch are uniform, to prevent a circuit fault caused by a too high stress and loss withstood by a switch in some branches.

With reference to the second aspect, in a second possible implementation, the controller reducing a duty cycle of a control signal of a charging switch in a first switch unit when determining that a characteristic current of a first resonance unit is greater than the average value includes: the controller reduces the duty cycle of the control signal of the charging switch when determining that the characteristic current of the first resonance unit is greater than the average value and a difference between the characteristic current the first resonance unit and the average value is greater than a first threshold. The controller reducing a duty cycle of a control signal of a discharging switch in the first switch unit when determining that the characteristic current of the first resonance unit is less than the average value includes: the controller reduces the duty cycle of the control signal of the discharging switch when determining that the characteristic current of the first resonance unit is less than the average value and a difference between the characteristic current the first resonance unit and the average value is greater than a second threshold.

With reference to the second aspect, in a second possible implementation, the controller determining an average value of characteristic currents of N resonance units includes: the controller detects instantaneous currents of the N resonance units; determines the characteristic currents of the N resonance units based on the instantaneous currents of the N resonance units; and calculates the average value based on the characteristic currents of the N resonance units.

With reference to the second aspect, in a second possible implementation, the controller includes a sampling unit and a control unit, and the controller determining an average value of characteristic currents of N resonance units includes: the sampling unit collects instantaneous current information of the N resonance units, and sends the instantaneous current information of the N resonance units to the control unit; and the control unit receives the instantaneous current information of the N resonance units, and determines a valid value of each of the instantaneous currents of the N resonance units and the average value based on the instantaneous current information of the N resonance units.

With reference to the second aspect, in a second possible implementation, the resonant switched capacitor converter is a two-level resonant switched capacitor converter, the resonance unit includes a resonant capacitor and a resonant inductor that are connected in series, the switch unit includes a first switch and a second switch, the first switch is the charging switch, the second switch is the discharging switch, and each of the N resonant switched capacitor branches further includes a first diode and a second diode; a first terminal of the first switch is connected to a first terminal of the input capacitor, a second terminal of the first switch is connected to a first terminal of the second switch and a first terminal of the resonance unit, and a second terminal of the second switch is connected to a second terminal of the input capacitor; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

With reference to the second aspect, in a second possible implementation, the resonant switched capacitor converter is a neutral point clamped (NPC)-type three-level resonant switched capacitor converter, the resonance unit includes a resonant capacitor and a resonant inductor that are connected in series, the input capacitor includes a first capacitor and a second capacitor, the switch unit includes a first switch, a second switch, a third switch, and a fourth switch, the first switch is the charging switch, the fourth switch is the discharging switch, and each of the N resonant switched capacitor branches further includes a first diode, a second diode, a third diode, and a fourth diode; a first terminal of the first switch is connected to a first terminal of the first capacitor, a second terminal of the first switch is connected to a first terminal of the second switch and a cathode of the third diode, a second terminal of the second switch is connected to a first terminal of the third switch and a first terminal of the resonance unit, a second terminal of the third switch is connected to a first terminal of the fourth switch and an anode of the fourth diode, a second terminal of the fourth switch is connected to a second terminal of the second capacitor, a first terminal of the second capacitor is connected to a second terminal of the first capacitor, an anode of the third diode, and a cathode of the fourth diode; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

With reference to the second aspect, in a second possible implementation, the resonant switched capacitor converter is an active neutral point clamped (ANPC)-type three-level resonant switched capacitor converter, the resonance unit includes a resonant capacitor and a resonant inductor that are connected in series, the input capacitor includes a first capacitor and a second capacitor, the switch unit includes a first switch, a second switch, a third switch, a fourth switch, a fifth switch, and a sixth switch, the first switch is the charging switch, the fourth switch is the discharging switch, and each of the N resonant switched capacitor branches further includes a first diode and a second diode; a first terminal of the first switch is connected to a first terminal of the first capacitor, a second terminal of the first switch is connected to a first terminal of the second switch and a first terminal of the fifth switch, a second terminal of the second switch is connected to a first terminal of the third switch and a first terminal of the resonance unit, a second terminal of the third switch is connected to a first terminal of the fourth switch and a second terminal of the sixth switch, a second terminal of the fourth switch is connected to a second terminal of the second capacitor, and a first terminal of the second capacitor is connected to a second terminal of the first capacitor, a second terminal of the fifth switch, and a first terminal of the sixth switch; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

According to a third aspect, a maximum power point tracking (MPPT) combiner box is provided, including the RSCC in any one of the first aspect and the implementations of the first aspect.

According to a fourth aspect, a power supply system is provided, including the RSCC in any one of the first aspect and the implementations of the first aspect.

DETAILED DESCRIPTION OF EMBODIMENTS

The following describes solutions of the embodiments with reference to accompanying drawings.

Figure 1:
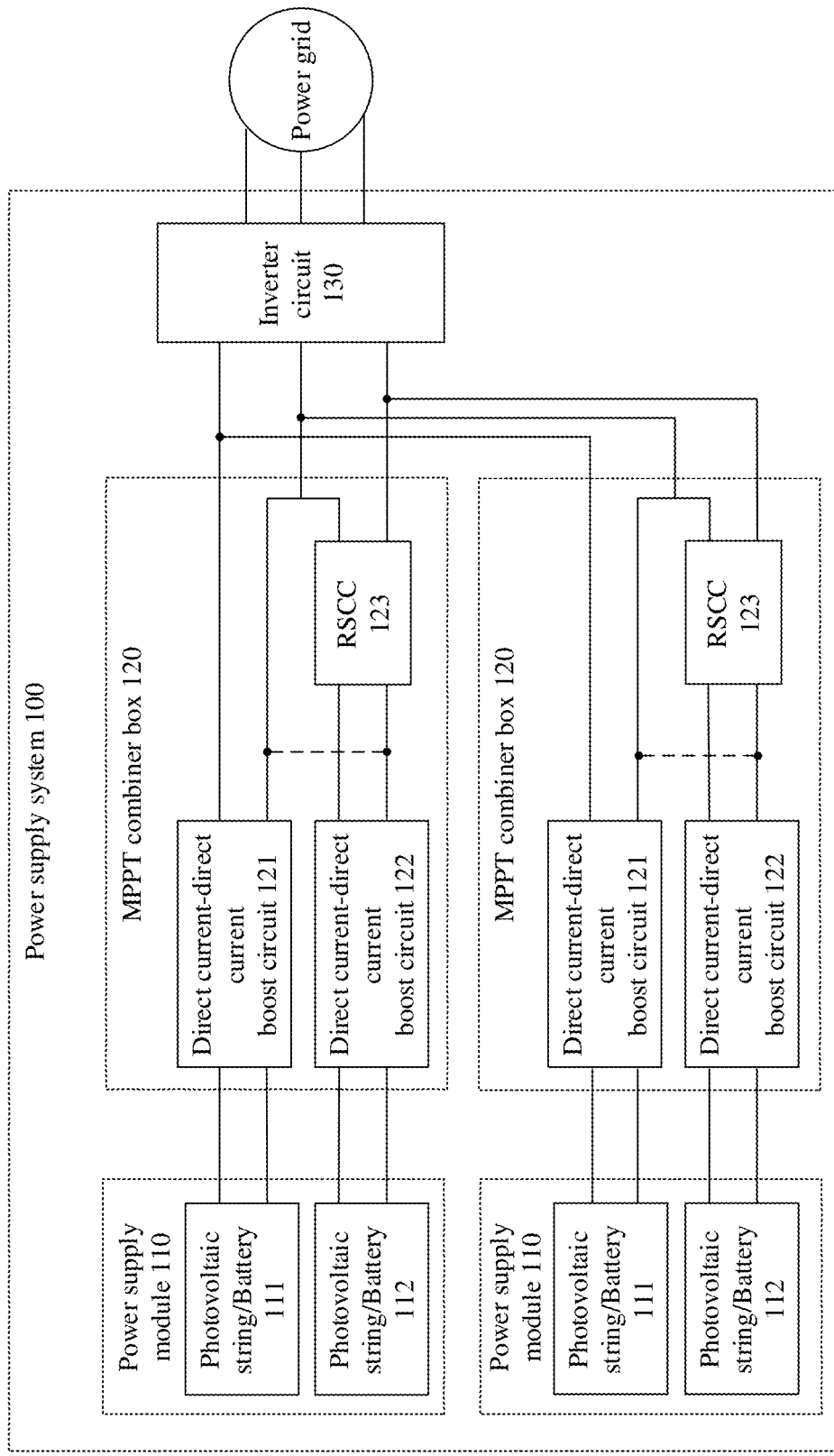
FIG. 1 is a schematic block diagram of an application scenario according to an embodiment.

FIG. 1 is a schematic block diagram of an application scenario according to the embodiments. As shown in FIG. 1, a resonant switched capacitor converter (RSCC) may be used in a power supply system 100. The power supply system 100 may generate electric energy and supply power to a power grid. For example, the power supply system 100 may include a power supply module 110, a maximum power point tracking (MPPT) combiner box 120, and an inverter circuit 130. The MPPT combiner box 120 may include a direct current-direct current boost circuit 121, a direct current-direct current boost circuit 122, and an RSCC 123. A positive output terminal of the direct current-direct current boost circuit 121 is connected to a positive input terminal of the inverter circuit 130, and a negative output terminal of the direct current-direct current boost circuit 121 is connected to a zero-potential input terminal of the inverter circuit 130. A positive output terminal of the direct current-direct current boost circuit 122 is connected to a positive input terminal of the RSCC 123, and a negative output terminal of the direct current-direct current boost circuit 122 is connected to a negative input terminal of the RSCC 123. A positive output terminal of the RSCC 123 is connected to the zero-potential input terminal of the inverter circuit 130, and a negative output terminal of the RSCC 123 is connected to a negative input terminal of the inverter circuit 130. In other words, the RSCC 123 may convert, into a negative voltage, a positive voltage output by the direct current-direct current boost circuit 122, connect in series the negative voltage and a voltage output by the direct current-direct current boost circuit 121, and output the voltages to the inverter circuit 130.

The power supply module 110 may output the generated electric energy to the MPPT combiner box 120. The MPPT combiner box 120 may output a direct current to the inverter circuit 130 after performing direct current voltage conversion. The inverter circuit 130 may convert the direct current into an alternating current, and output the alternating current to the power grid. For example, the power supply module 110 that provides the electric energy may include but is not limited to a photovoltaic (PV) string and/or a battery. It should be understood that a photovoltaic string/battery 111 and a photovoltaic string/battery 112 in the power supply module 110 may be the same, that is, each are a photovoltaic string or battery; or 111 and 112 may be different, that is, in 111 and 112, one is a battery, and the other is a photovoltaic string. This is not limited.

Optionally, in FIG. 1, the negative output terminal of the direct current-direct current boost circuit 121 may alternatively be connected to the negative output terminal of the RSCC 123. In other words, the negative output terminal of the direct current-direct current boost circuit 121 and the negative output terminal of the direct current-direct current boost circuit 122 are equipotential.

It should be further understood that, as shown in FIG. 1, the power supply system 100 may include one or more power supply modules 110, and all the power supply modules may be the same or may be different. Correspondingly, the power supply system 100 may include one or more MPPT combiner boxes 120. In other words, after a plurality of MPPT combiner boxes 120 perform direct current voltage conversion on electric energy generated by a plurality of power supply modules 110, the electric energy may be input into the inverter circuit 130. It should be understood that the plurality of power supply modules 110 may be the same or different, and the plurality of MPPT combiner boxes may be the same or different. This is not limited.

Optionally, the power supply system 100 in FIG. 1 may further include a transformer. The transformer is configured to: receive the alternating current output by the inverter circuit 130, perform voltage conversion on the alternating current, and then input the alternating current into the power grid.

The following describes the RSCC provided in this embodiment with reference to FIG. 2 to FIG. 11.

Figure 2:
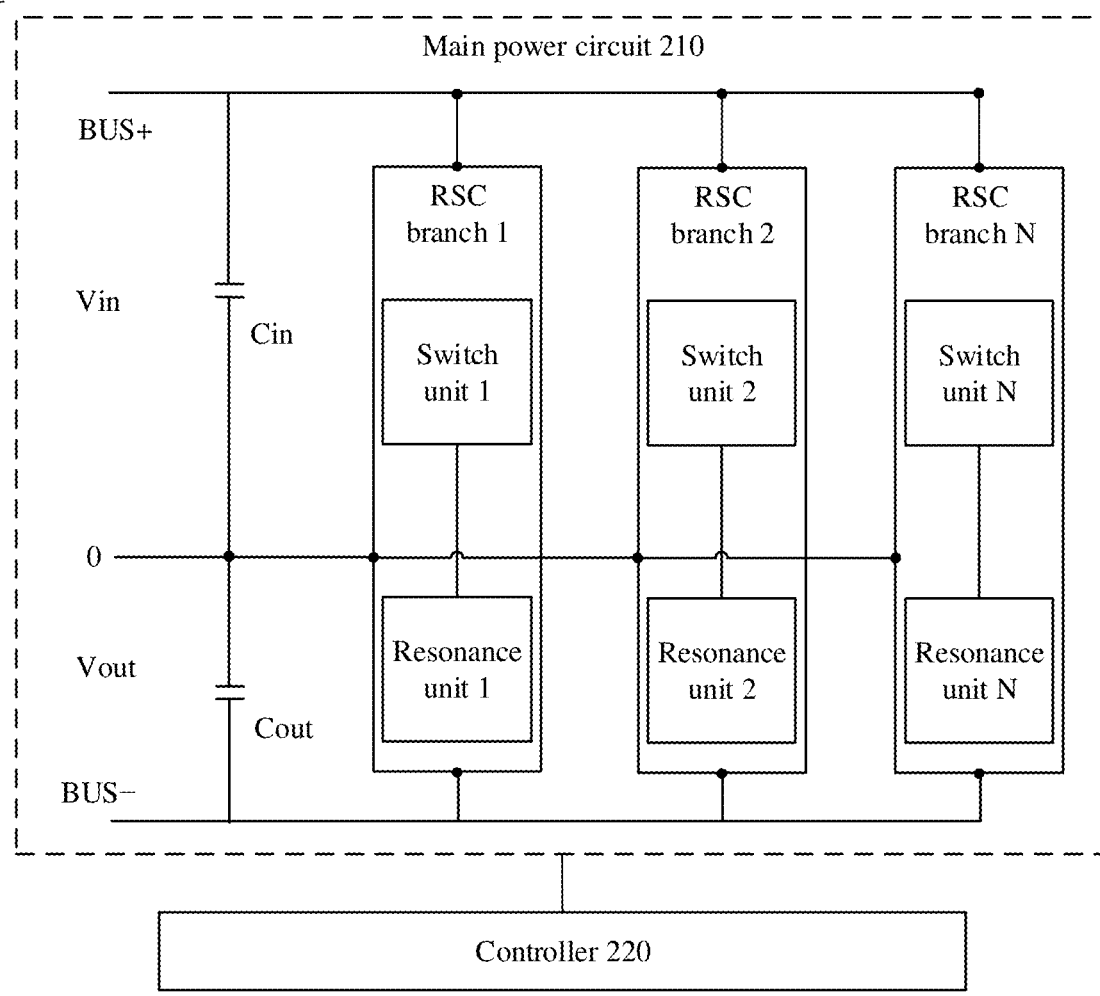
FIG. 2 is a schematic diagram of an RSCC according to an embodiment.

FIG. 2 is a schematic diagram of an RSCC 200 according to an embodiment. As shown in FIG. 2, the RSCC 200 may include a main power circuit 210 and a controller 220. The main power circuit 210 may include an input capacitor Cin, an output capacitor Cout, and N parallel resonant switched capacitor (RSC) branches x (x=1, 2, 3, . . . , N). Each of the N RSC branches includes a switch unit x and a resonance unit x. Two terminals of the input capacitor Cin are respectively connected to two terminals of input terminals of the main power circuit 210, that is, a BUS+ terminal and a 0 terminal in FIG. 2, and two terminals of the output capacitor Cout are respectively connected to two terminals of output terminals of the main power circuit 210, that is, the 0 terminal and a BUS− terminal in FIG. 2. The input capacitor Cin may be one capacitor, or may be formed by connecting two or more capacitors in series.

It should be understood that when the RSCC provided in this embodiment is applied to the power supply system 100 in FIG. 1, a first input terminal (corresponding to the BUS+ terminal in the figure) of the main power circuit 210 may be used as a positive input terminal of an RSCC 123, a second input terminal (corresponding to the 0 terminal in the figure) of the main power circuit 220 may be used as a negative input terminal of the RSCC 123, a first output terminal (corresponding to the 0 terminal in the figure) of the main power circuit 220 may be used as a positive output terminal of the RSCC 123, and a second output terminal (corresponding to the BUS− terminal in the figure) of the main power circuit 220 may be used as a negative output terminal of the RSCC 123.

In other words, the RSCC provided in this embodiment may also be used in another scenario. For example, the first input terminal (corresponding to the BUS+ terminal in the figure) of the main power circuit 220 may be used as the positive output terminal of the RSCC 123, and the second output terminal (corresponding to the BUS− terminal in the figure) of the main power circuit 220 may be used as the negative output terminal of the RSCC 123. In an actual application, specific two terminals that are in the BUS+ terminal, the 0 terminal, and the BUS− terminal and that are used as the positive output terminal and the negative output terminal of the RSCC 123 may depend on an actual application environment. This is not limited in this embodiment. FIG. 1 shows merely an example description of an application scenario of this embodiment.

In the RSCC 200 shown in FIG. 2, the controller 220 may control an on state of a switch in the switch unit x, so that the resonance unit x obtains electric energy from the input capacitor Cin in a charging stage, and the resonance unit x outputs the electric energy to the output capacitor Cout in a discharging stage. It should be noted that each switch unit x includes a charging switch x and a discharging switch x. On duration of the charging switch x may determine duration in which the resonance unit x obtains electric energy from the input capacitor Cin. In other words, when the charging switch x is turned on, an RSC branch x in which the charging switch x is located is in a charging stage. On duration of the discharging switch x may determine duration in which the resonance unit x outputs electric energy to the output capacitor Cout. In other words, when the discharging switch x is turned on, an RSC branch x in which the discharging switch x is located is in a discharging stage.

In an example, when another condition remains unchanged, more parallel RCS branches in the main power circuit of the RSCC indicate a higher conversion power of the RSCC. However, when a plurality of parallel RSC branches exist in the main power circuit, because circuit parameters of the branches are different, currents of resonance units in the branches are not uniform. Consequently, switches in some branches withstand a large current, affecting a stress and a loss of the switches in the branches.

It should be understood that when a rated current is not exceeded, a magnitude of a working current of a switch device exerts low impact on a stress withstood by the switch device. However, if the working current exceeds the rated current, a switch withstands a large stress, to lead to a large loss.

In view of this, the embodiments provide an RSCC to make currents of parallel branches in the RSCC uniform, so that a stress and a loss of a switch of each branch are uniform, to prevent a circuit fault caused by a too high stress and loss withstood by a switch in some branches.

In the RSCC provided in the embodiments, the controller 220 may be configured to determine an average value of characteristic currents of N resonance units. The N resonance units are in a one-to-one correspondence with N resonant switched capacitor branches, and the characteristic current is a valid value or a peak value of an instantaneous current of any resonance unit in one resonant switching period. The controller 220 may be configured to reduce a duty cycle of a control signal of a charging switch in a first switch unit when determining that a characteristic current of a first resonance unit is greater than the average value. An RSC branch corresponding to the charging switch is in a charging stage when the charging switch is turned on. Alternatively, the controller 220 may be configured to reduce a duty cycle of a control signal of a discharging switch in a first switch unit when determining that a characteristic current of a first resonance unit is less than the average value. An RSC branch corresponding to the discharging switch is in a discharging stage when the discharging switch is turned on. The first resonance unit is any one of the N resonance units, and the first switch unit is a switch unit in a resonant switched capacitor branch in which the first resonance unit is located. It should be understood that, in the embodiments, N is an integer greater than 1.

For example, the controller 220 may determine a valid value or a peak value of an instantaneous current flowing through each of the N resonance units in one resonant switching period. The valid value or the peak value may also be referred to as a characteristic current, and an average value of N characteristic currents is further calculated. The average value may be understood as a standard current withstood by each resonance unit. When it is determined that the characteristic current of the first resonance unit is greater than the average value, it indicates that a current withstood by a switch in the first switch unit is greater than the standard current, and the controller 220 may be configured to reduce the duty cycle of the control signal of the charging switch. In this manner, a time period in which a branch in which the first resonance unit is located is in a charging stage is reduced, and the characteristic current of the first resonance unit is reduced in a next resonant switching period, so that a stress and a loss withstood by the switch in the first switch unit are reduced. When it is determined that the characteristic current of the first resonance unit is less than the average value, it indicates that a current flowing through a switch in the first switch unit is less than the standard current, and the controller 220 may be configured to reduce the duty cycle of the control signal of the discharging switch. In this manner, a time period in which a branch in which the first resonance unit is located is in a discharging stage is reduced, and the characteristic current of the first resonance unit is increased in a next resonant switching period, so that a stress and a loss withstood by the switch in the first switch unit tend to be uniform.

Therefore, the RSCC provided can make currents of parallel branches in the RSCC uniform, so that a stress and a loss of a switch of each branch are uniform, to prevent a circuit fault caused by a too high stress and loss withstood by a switch in some branches.

It should be understood that, in the embodiments, the duty cycle is a proportion of a time period of a high level of a control signal of a switch in a pulse period to the entire pulse period. For example, for a pulse width modulation wave (PWM wave) with a one-second high level and a one-second low level, the duty cycle is 50%.

It should be further understood that, in the embodiments, a specific decrement of a duty cycle of a control signal of a charging switch or a discharging switch may be adjusted in a closed loop based on a difference between a characteristic current of a resonance unit and the average value. The decrement of the duty cycle may be large when the difference between the characteristic current and the average value is large; and the decrement of the duty cycle may be small when the difference is small.

In a possible implementation, the controller 220 may be configured to reduce the duty cycle of the control signal of the charging switch when determining that the characteristic current of the first resonance unit is greater than the average value and a difference between the characteristic current of the first resonance unit and the average value is greater than a first threshold; or reduce the duty cycle of the control signal of the discharging switch when determining that the characteristic current of the first resonance unit is less than the average value and a difference between the characteristic current of the first resonance unit and the average value is greater than a second threshold.

In other words, in the embodiments, the controller 220 may adjust the duty cycle of the control signal of the charging switch or the discharging switch when the difference between the characteristic current of the first resonance unit and the average value is greater than a specific threshold to avoid unnecessary control that is performed due to a fluctuation in a current in a circuit, and improve control efficiency of the RSCC.

In a possible implementation, the controller 220 is configured to: detect instantaneous currents of the N resonance units; determine the characteristic currents of the N resonance units based on the instantaneous currents of the N resonance units; and calculate the average value based on the characteristic currents of the N resonance units.

In the embodiments, the controller 220 may detect the instantaneous current of the resonance unit in real time, obtain the valid value or the peak value of the instantaneous current of the resonance unit in one resonant switching period, and calculate the average value based on the valid values or the peak values of the N resonance units.

Therefore, in the embodiments, an instantaneous current of a resonance unit in each branch can be detected in real time, and a detection result is used to further control the main power circuit 210, so that the main power circuit can be adjusted in a closed loop and control efficiency of the RSCC can be improved.

In a possible implementation, the controller includes a sampling unit and a control unit; the sampling unit may be configured to: collect instantaneous current information of the N resonance units, and send the instantaneous current information of the N resonance units to the control unit; and the control unit may be configured to: receive the instantaneous current information of the N resonance units; determine the characteristic currents of the N resonance units based on the instantaneous current information of the N resonance units; and calculate the average value based on the characteristic currents of the N resonance units.

In this embodiment, a function of the controller 220 may be separately implemented by the sampling unit and the control unit. Therefore, in this embodiment, currents of parallel branches in the RSCC can be uniform based on an existing product architecture, to reduce costs.

Figure 3:
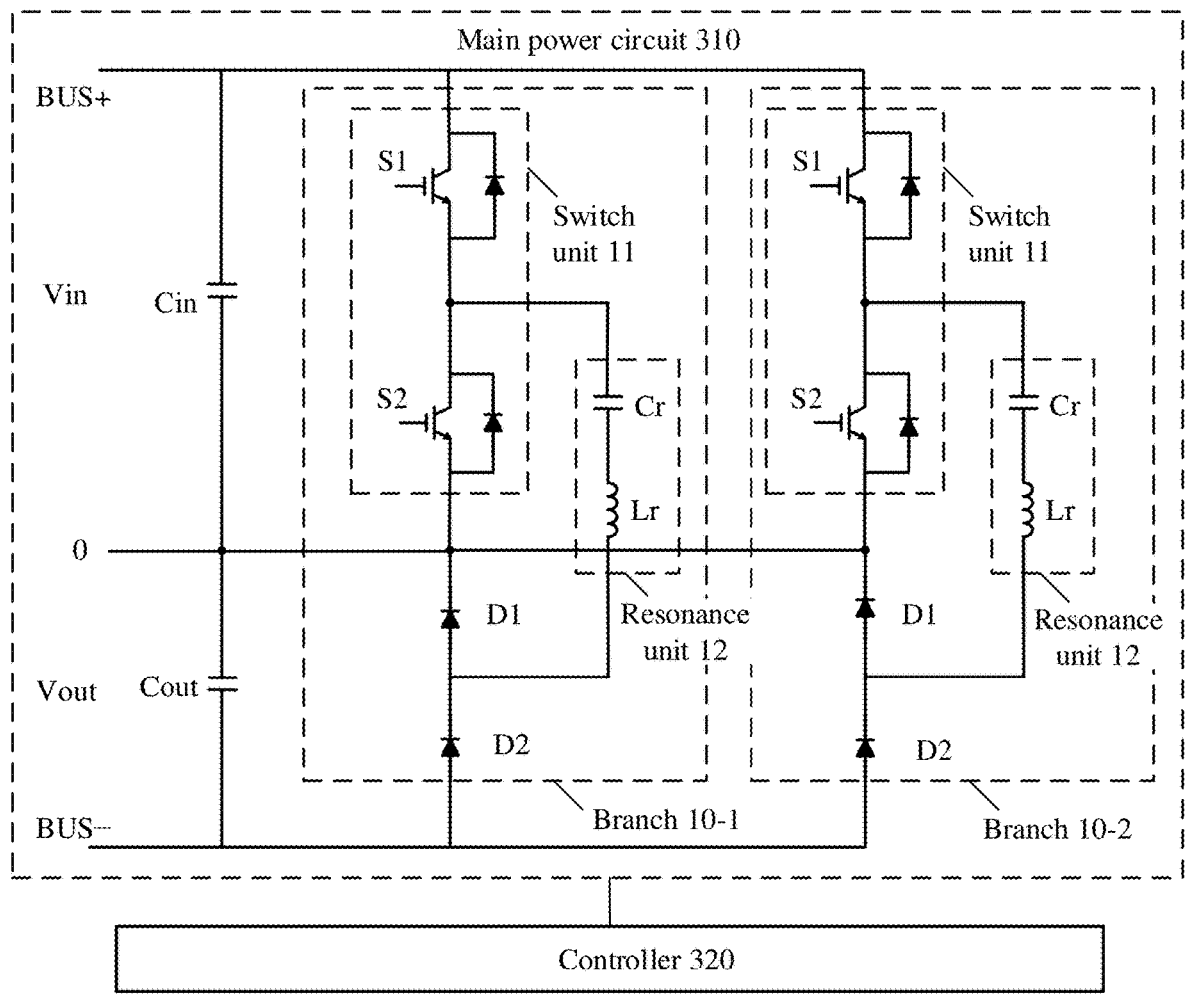
FIG. 3 is a schematic diagram of a structure of a two-level RSCC according to an embodiment.

For example, FIG. 3 is a schematic diagram of a structure of a two-level RSCC 300 according to an embodiment. As shown in FIG. 3, the RSCC 300 includes a main power circuit 310 and a controller 320. The main power circuit 310 is a two-level circuit topology. It should be understood that, in FIG. 3, an example in which the main power circuit 310 includes two RSC branches (that is, a branch 10-1 and a branch 10-2) is only used for description. However, the RSCC shown in FIG. 3 may alternatively include three or more same or different branches.

As shown in FIG. 3, the main power circuit 310 includes an input capacitor Cin, an output capacitor Cout, and the branches 10-1 and 10-2. Two terminals of the input capacitor Cin are respectively connected to two terminals of input terminals of the main power circuit 310, that is, a BUS+ terminal and a 0 terminal in FIG. 3, and two terminals of the output capacitor Cout are respectively connected to two terminals of output terminals of the main power circuit 310, that is, the 0 terminal and a BUS− terminal in FIG. 3. The branch 10-1 and the branch 10-2 each include a switch unit 11, a resonance unit 12, a diode D1 (that is, a first diode), and a diode D2 (that is, a second diode). The switch unit 11 includes two power switch devices S1 (that is, a first switch) and S2 (that is, a second switch), and the resonance unit 12 includes a resonant capacitor Cr and a resonant inductor Lr that are connected in series.

In the main power circuit 310 shown in FIG. 3, a first terminal of the switch S1 is connected to a first terminal of the input capacitor Cin, a second terminal of the switch S1 is connected to a first terminal of the switch S2 and a first terminal of the resonance unit 12, and a second terminal of the switch S2 is connected to a second terminal of the input capacitor. A second terminal of the resonance unit 12 is connected to an anode of D1 and a cathode of D2, a cathode of D1 is connected to a first terminal of the output capacitor Cout, and an anode of D2 is connected to a second terminal of the output capacitor Cout.

Figure 4:
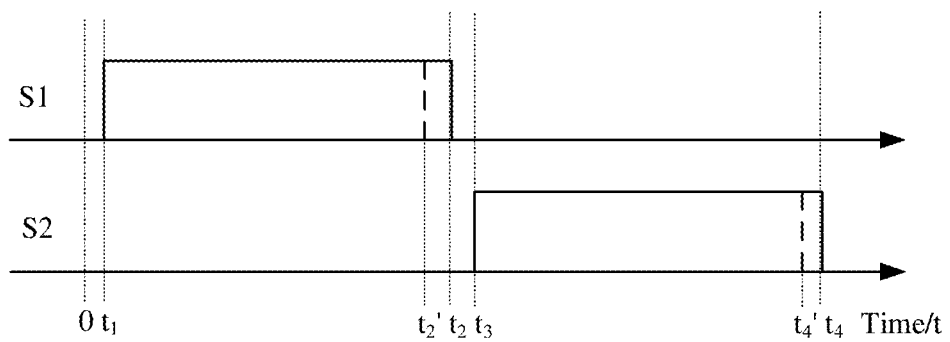
FIG. 4 shows a control time sequence of a switch in a switch unit of a main power circuit in a two-level RSCC.

FIG. 4 shows a control time sequence of a controller 320 for a switch in a switch unit 11 in a main power circuit 310. For the branch 10-1, in an initial state, S1, S2, S3, and S4 are all in an off state. At a moment $t_1$, S1 is turned on, and S2 remains unchanged. In a time period $t_1$-$t_2$, S1 is continuously on, and S2 is continuously off. At a moment $t_2$, S1 is turned off. At a moment $t_3$, S2 is turned on. In a time period $t_3$-$t_4$, S1 is continuously off, and S2 is continuously on. At a moment $t_4$, S2 is turned off. After the moment $t_4$, the main power circuit 310 returns to an initial state. Herein, $t_1$-$t_4$ may be referred to as one resonant switching period.

When S1 is turned on and S2 is turned off, a current flow direction is the BUS+ terminal, S1, the resonance unit 12, D1, and the 0 terminal, the branch 10-1 is in a charging stage, and the input capacitor Cin charges the resonant capacitor Cr. When S1 is turned off and S2 is turned on, a current flow direction is the resonance unit 12, S2, the 0 terminal, Cout, the BUS− terminal, and D2, the branch 10-1 is in a discharging stage, and the resonant capacitor Cr is used as a power supply to charge the output capacitor Cout. In other words, the controller 320 may control an on state of the switch unit 11 in the main power circuit 310, so that any resonance unit x can obtain electric energy from the input capacitor Cin in a charging stage, and output the electric energy to the output capacitor Cout in a discharging stage.

Figure 5:
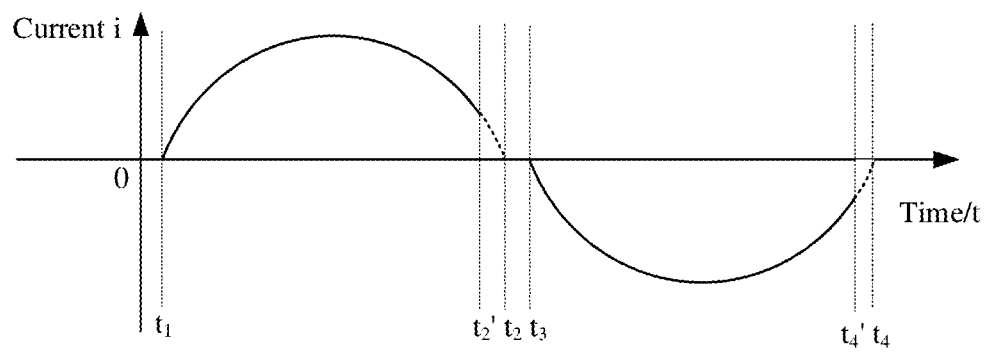
FIG. 5 is a schematic diagram of a change in an instantaneous current of a resonance unit in a two-level RSCC in one resonant switching period.

FIG. 5 is a schematic diagram of a change in an instantaneous current flowing through a resonance unit 12 in a branch 10-1 in one resonant switching period. It can be understood from FIG. 4 and FIG. 5 that, in the charging stage and the discharging stage, directions of instantaneous currents flowing through the resonance unit in the branch 10-1 are opposite. A length of the time period $t_1$-$t_2$ in which the switch S1 is on determines a charging time length of the resonant capacitor Cr, and a length of the time period $t_3$-$t_4$ in which the switch S2 is on determines a discharging time length of the resonant capacitor Cr. Therefore, S1 may also be referred to as a charging switch. When S1 is on, the branch 10-1 is in the charging stage. S2 may also be referred to as a discharging switch. When S2 is on, the branch 10-1 is in the discharging stage.

In FIG. 4 and FIG. 5, the branch 10-1 is used as an example for description. For the branch 10-2, a control time sequence of a switch in the switch unit 11 and a change in an instantaneous current of the resonance unit 12 are the same as those of the branch 10-1. However, control content of the switch units 11 of the branch 10-1 and the branch 10-2 at a same moment is not necessarily the same. At a moment, the branch 10-1 may be in the charging stage, and the branch 10-2 may be in a discharging stage.

The controller 320 may collect instantaneous currents flowing through two resonance units 12 in one resonant switching period, and determine characteristic currents of the two resonance units based on the instantaneous currents of the resonance units 12. The characteristic current may be a peak value of an instantaneous current in one resonant switching period, or may be a valid value. Further, an arithmetic average value of the characteristic currents is calculated based on the characteristic currents of the N resonance units.

The branch 10-1 is used as an example. If determining that the characteristic current of the resonance unit 12 is greater than the average value, the controller 320 may be configured to reduce a duty cycle of a control signal of the switch S1 in the branch 10-1. For example, as shown in FIG. 4 and FIG. 5, a turn-off moment of S1 may be advanced to '$t_2$', so that a time period in which the branch 10-1 is in the charging stage is reduced, and in a next resonant switching period, the characteristic current of the resonance unit 12 is reduced. Therefore, a stress and loss withstood by the switch in the switch unit 11 are reduced. If determining that the characteristic current of the resonance unit 12 is less than the average value, the controller 320 may be configured to reduce a duty cycle of a control signal of the switch S2. For example, as shown in FIG. 4 and FIG. 5, a turn-off moment of S2 may be advanced to '$t_4$', so that a time period in which a branch in which the resonance unit 12 is located is in a discharging stage is reduced, and in a next resonant switching period, the characteristic current of the resonance unit 12 is increased. Therefore, a stress and loss withstood by the switch in the switch unit 11 tend to be uniform. For other branches, a case is similar, and details are not described herein again.

Therefore, the RSCC provided can make currents of parallel branches in the RSCC uniform, so that a stress and a loss of a switch of each branch are uniform, to prevent a circuit fault caused by a too high stress and loss withstood by a switch in some branches.

Figure 6:
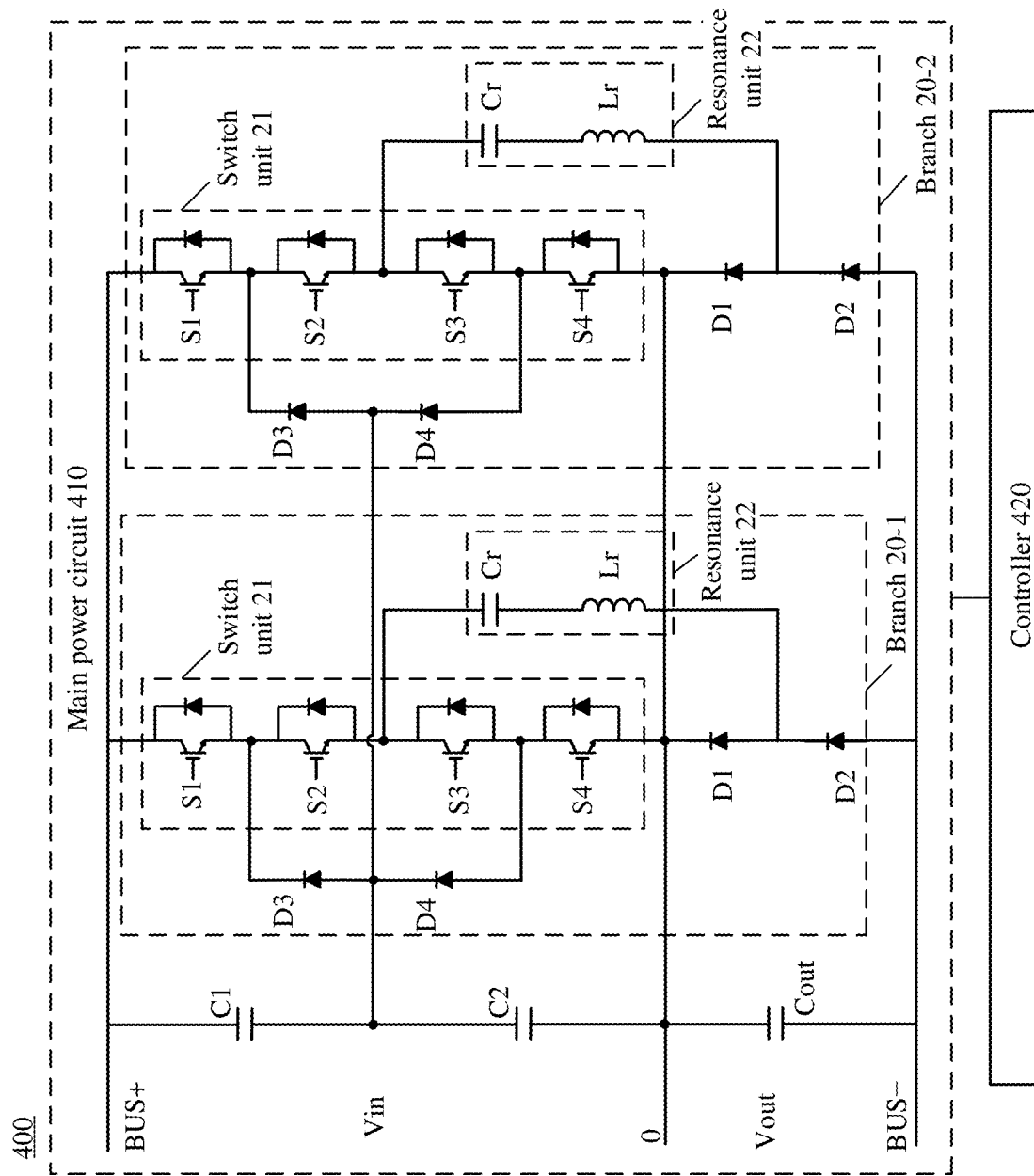
FIG. 6 is a schematic diagram of a structure of an NPC-type three-level RSCC according to an embodiment.

For example, FIG. 6 is a schematic diagram of a structure of a neutral point clamped (NPC)-type three-level RSCC 400 according to an embodiment. As shown in FIG. 6, the RSCC 400 includes a main power circuit 410 and a controller 420, and the main power circuit 410 is an NPC-type three-level topology. It should be understood that, in FIG. 6, an example in which the main power circuit 410 includes two RSC branches (that is, a branch 20-1 and a branch 20-2) is only used for description. However, the RSCC shown in FIG. 6 may alternatively include three or more same or different branches.

As shown in FIG. 6, the main power circuit 410 includes input capacitors C1 (that is, a first capacitor) and C2 (that is, a second capacitor), an output capacitor Cout, and branches 20-1 and 20-2. Two terminals of the input capacitors C1 and C2 that are connected in series are respectively connected to two terminals of input terminals of the main power circuit 410, that is, a BUS+ terminal and a 0 terminal in FIG. 6, and two terminals of the output capacitor Cout are respectively connected to two terminals of output terminals of the main power circuit 410, that is, the 0 terminal and a BUS− terminal in FIG. 6. The branch 20-1 and the branch 20-2 each include a switch unit 21, a resonance unit 22, and diodes D1 (that is, a first diode), D2 (that is, a second diode), D3 (that is, a third diode), and D4 (that is, a fourth diode). The switch unit 21 includes four power switch devices S1 (that is, a first switch), S2 (that is, a second switch), S3 (that is, a third switch), and S4 (that is, a fourth switch). The resonance unit 22 includes a resonant capacitor Cr and a resonant inductor Lr that are connected in series.

In the main power circuit 410 shown in FIG. 6, a first terminal of the switch S1 is connected to a first terminal of the first capacitor C1, a second terminal of the switch S1 is connected to a first terminal of the switch S2 and a cathode of D3, a second terminal of the switch S2 is connected to a first terminal of the switch S3 and a first terminal of the resonance unit 22, a second terminal of the switch S3 is connected to a first terminal of the switch S4 and an anode of D4, a second terminal of the switch S4 is connected to a second terminal of the second capacitor C2, and a first terminal of the second capacitor C2 is connected to a second terminal of the first capacitor C1, an anode of D3, and a cathode of D4. A second terminal of the resonance unit is connected to an anode of D1 and a cathode of D2, a cathode of D1 is connected to a first terminal of the output capacitor Cout, and an anode of D2 is connected to a second terminal of the output capacitor Cout.

Figure 7:
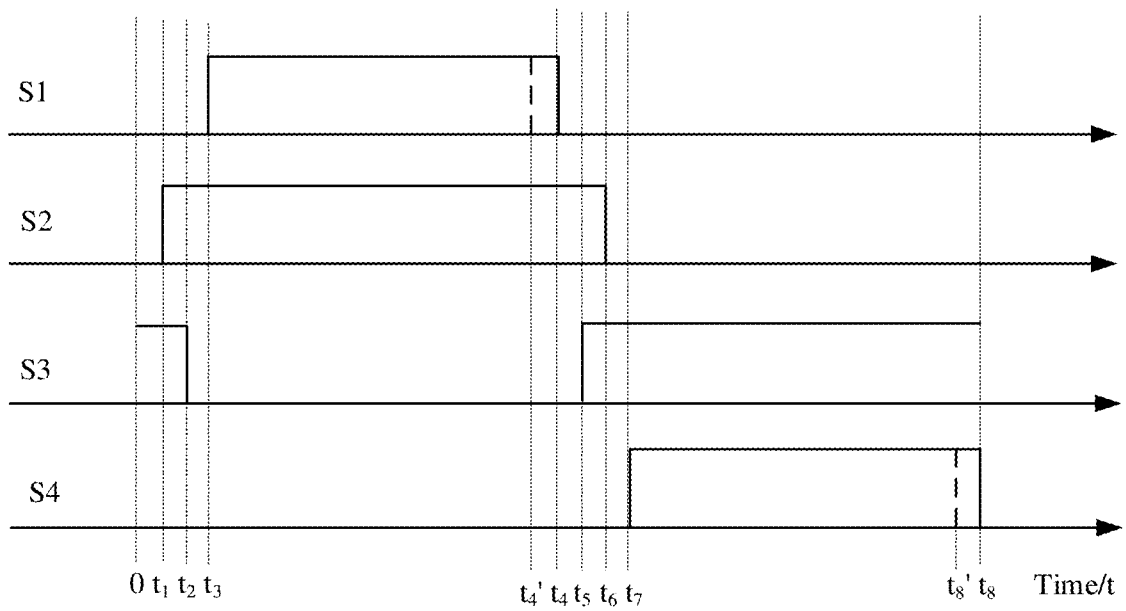
FIG. 7 shows a control time sequence of a switch in a switch unit of a main power circuit in an NPC-type three-level RSCC.

FIG. 7 shows a control time sequence of a controller 420 for a switch in a switch unit 21 in a main power circuit 410. For the branch 20-1, in an initial state, S1, S2, and S4 are in an off state, and S3 is in an on state. At a moment $t_1$, S2 is turned on. At a moment $t_2$, S3 is turned off. At a moment $t_3$, S1 is turned on. At a moment $t_4$, S1 is turned off. At a moment $t_5$, S3 is turned on. At a moment $t_6$, S2 is turned off. At a moment $t_7$, S4 is turned on. At a moment $t_8$, S4 is turned off. After the moment $t_8$, the circuit returns to the initial state. Herein, $t_1$-$t_8$ may be referred to as one resonant switching period.

When S1 and S2 are turned on and S3 and S4 are turned off, a current flow direction is the BUS+ terminal, S1, S2, the resonance unit 22, D1, and the 0 terminal, the branch 20-1 is in a charging stage, and the input capacitors C1 and C2 charge the resonant capacitor Cr. When S1 and S2 are turned off and S3 and S4 are turned on, a current flow direction is the resonance unit 22, S3, S4, the 0 terminal, Cout, the BUS− terminal, and D2, the branch 20-1 is in a discharging stage, and the resonant capacitor Cr is used as a power supply to charge the output capacitor Cout. In other words, the controller 420 may control an on state of the switch unit 21 in the main power circuit 410, so that any resonance unit x can obtain electric energy from the input capacitor Cin in a charging stage, and output the electric energy to the output capacitor Cout in a discharging stage.

Figure 8:
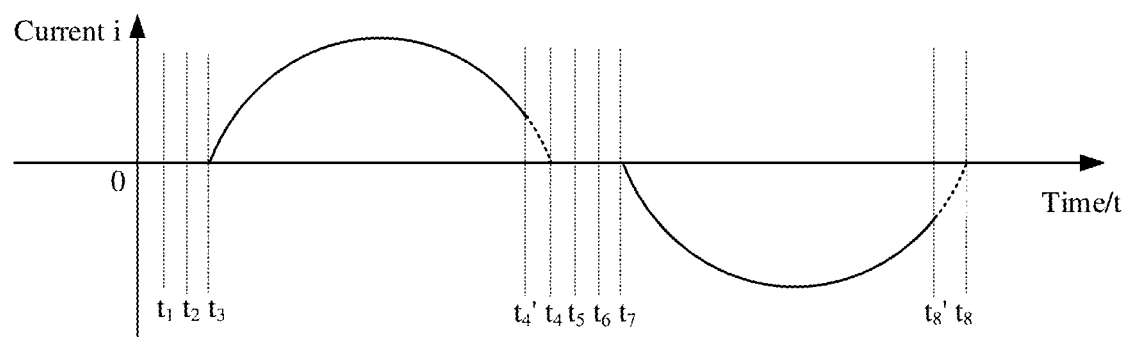
FIG. 8 is a schematic diagram of a change in an instantaneous current of a resonance unit in an NPC-type three-level RSCC in one resonant switching period.

FIG. 8 is a schematic diagram of a change in an instantaneous current flowing through a resonance unit 22 in a branch 20-1 in one resonant switching period. It can be understood from FIG. 7 and FIG. 8 that, in the charging stage and the discharging stage, directions of instantaneous currents flowing through the resonance unit in the branch 20-1 are opposite. A length of a time period $t_3$-$t_4$ in which the switch S1 is on determines a charging time length of the resonant capacitor, and a length of a time period $t_7$-$t_8$ in which the switch S4 is on determines a discharging time length of the resonant capacitor. Therefore, S1 may also be referred to as a charging switch. When S1 is on, the branch 21-1 is in a charging stage. S4 may also be referred to as a discharging switch. When S4 is on, the branch 21-1 is in a discharging stage.

In FIG. 7 and FIG. 8, the branch 20-1 is used as an example for description. For the branch 20-2, a control time sequence of a switch in the switch unit 21 and a change in an instantaneous current of the resonance unit 22 are the same as those of the branch 20-1. However, control content of the switch units 21 of the branch 20-1 and the branch 20-2 at a same moment is not necessarily the same. At a moment, the branch 20-1 may be in the charging stage, and the branch 20-2 may be in a discharging stage.

The controller 420 may collect instantaneous currents flowing through two resonance units 22 in one resonant switching period, and determine characteristic currents of the two resonance units based on the instantaneous currents of the resonance units 22. The characteristic current may be a peak value of an instantaneous current in one resonant switching period, or may be a valid value. Further, an arithmetic average value of the characteristic currents is calculated based on the characteristic currents of the N resonance units.

The branch 20-1 is used as an example. If determining that the characteristic current of the resonance unit 22 is greater than the average value, the controller 420 may be configured to reduce a duty cycle of a control signal of the switch S1 in the branch 20-1. For example, as shown in FIG. 7 and FIG. 8, a turn-off moment of S1 may be advanced to '$t_4$', so that a time period in which the branch 20-1 is in the charging stage is reduced, and in a next resonant switching period, the characteristic current of the resonance unit 22 is reduced. Therefore, a stress and loss withstood by the switch in the switch unit 21 are reduced. If determining that the characteristic current of the resonance unit 22 is less than the average value, the controller 420 may be configured to reduce a duty cycle of a control signal of the switch S4. For example, as shown in FIG. 7 and FIG. 8, a turn-off moment of S4 may be advanced to '$t_8$', so that a time period in which a branch in which the resonance unit 22 is located is in a discharging stage is reduced, and in a next resonant switching period, the characteristic current of the resonance unit 22 is increased. Therefore, a stress and loss withstood by the switch in the switch unit 21 tend to be uniform. For other branches, a case is similar, and details are not described herein again.

Therefore, the RSCC provided can make currents of parallel branches in the RSCC uniform, so that a stress and a loss of a switch of each branch are uniform, to prevent a circuit fault caused by a too high stress and loss withstood by a switch in some branches.

Figure 9:
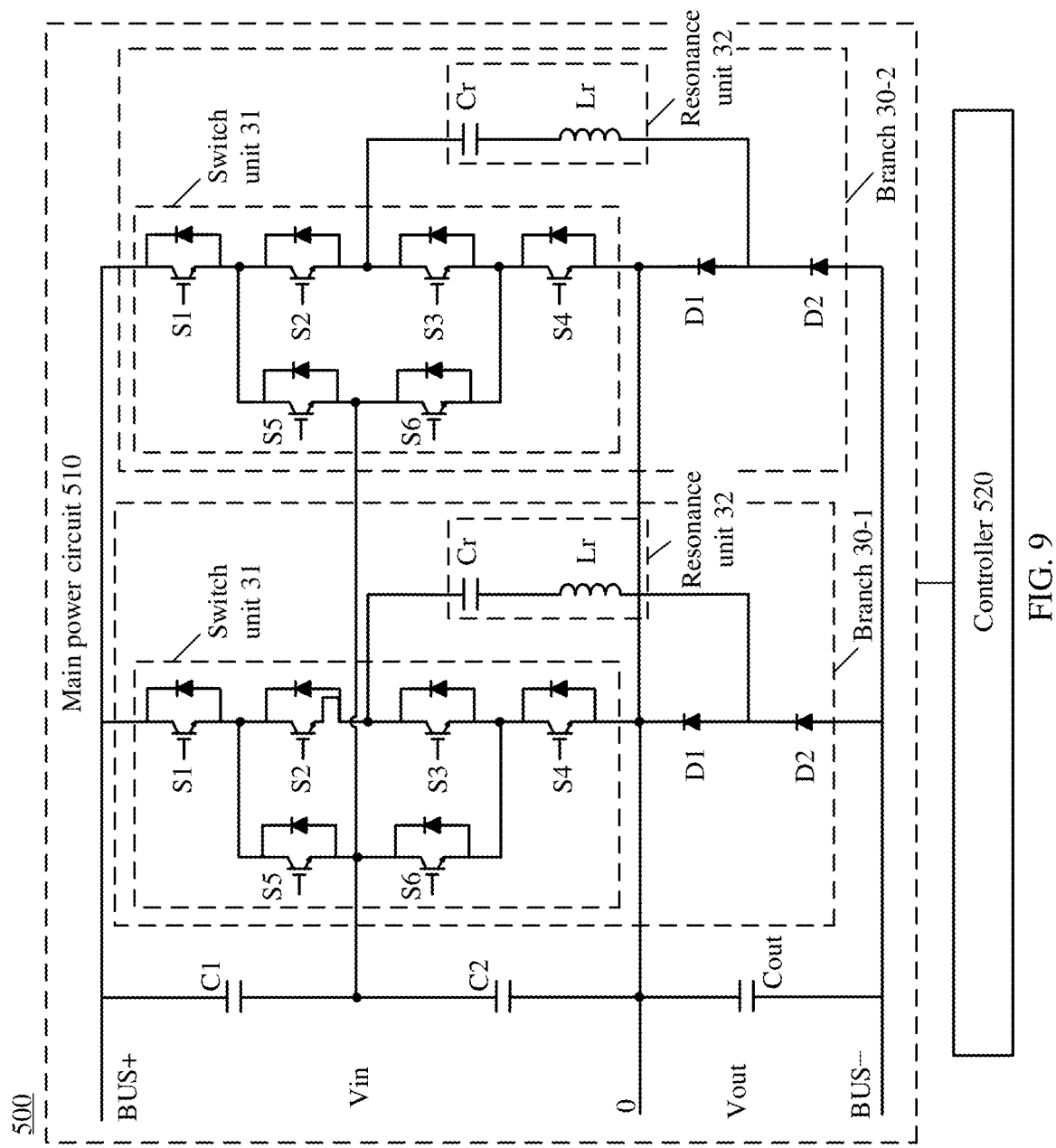
FIG. 9 is a schematic diagram of a structure of an ANPC-type three-level RSCC according to an embodiment.

For example, FIG. 9 is a schematic diagram of a structure of an active neutral point clamped (ANPC)-type three-level RSCC 500 according to an embodiment. As shown in FIG. 9, the RSCC 500 includes a main power circuit 510 and a controller 520, and the main power circuit 510 is an NPC-type three-level topology. It should be understood that, in FIG. 9, an example in which the main power circuit 510 includes two RSC branches (that is, a branch 30-1 and a branch 30-2) is only used for description. However, the RSCC shown in FIG. 9 may alternatively include three or more same or different branches.

As shown in FIG. 9, the main power circuit 510 includes input capacitors C1 (that is, a first capacitor) and C2 (that is, a second capacitor), an output capacitor Cout, and branches 30-1 and 30-2. Two terminals of the input capacitors C1 and C2 that are connected in series are respectively connected to two terminals of input terminals of the main power circuit 510, that is, a BUS+ terminal and a 0 terminal in FIG. 9, and two terminals of the output capacitor Cout are respectively connected to two terminals of output terminals of the main power circuit 510, that is, the 0 terminal and a BUS− terminal in FIG. 9. The branch 30-1 and the branch 30-2 each include a switch unit 31, a resonance unit 32, and diodes D1 (that is, a first diode) and D2 (that is, a second diode). The switch unit 31 includes two power switch devices S1 (that is, a first switch) and S2 (that is, a second switch), and the resonance unit 12 includes a resonant capacitor Cr and a resonant inductor Lr that are connected in series.

In the main power circuit 510 shown in FIG. 9, a first terminal of the switch S1 is connected to a first terminal of the first capacitor C1, a second terminal of the switch S1 is connected to a first terminal of the switch S2 and a first terminal of the switch S5, a second terminal of the switch S2 is connected to a first terminal of the switch S3 and a first terminal of the resonance unit 32, a second terminal of the switch S3 is connected to a first terminal of the switch S4 and a second terminal of the switch S6, a second terminal of the switch S4 is connected to a second terminal of the second capacitor C2, and a first terminal of the second capacitor C2 is connected to a second terminal of the first capacitor C1, a second terminal of the switch S5, and a first terminal of the switch S6. A second terminal of the resonance unit 32 is connected to an anode of D1 and a cathode of D2, a cathode of D1 is connected to a first terminal of the output capacitor Cout, and an anode of D2 is connected to a second terminal of the output capacitor Cout.

Figure 10:
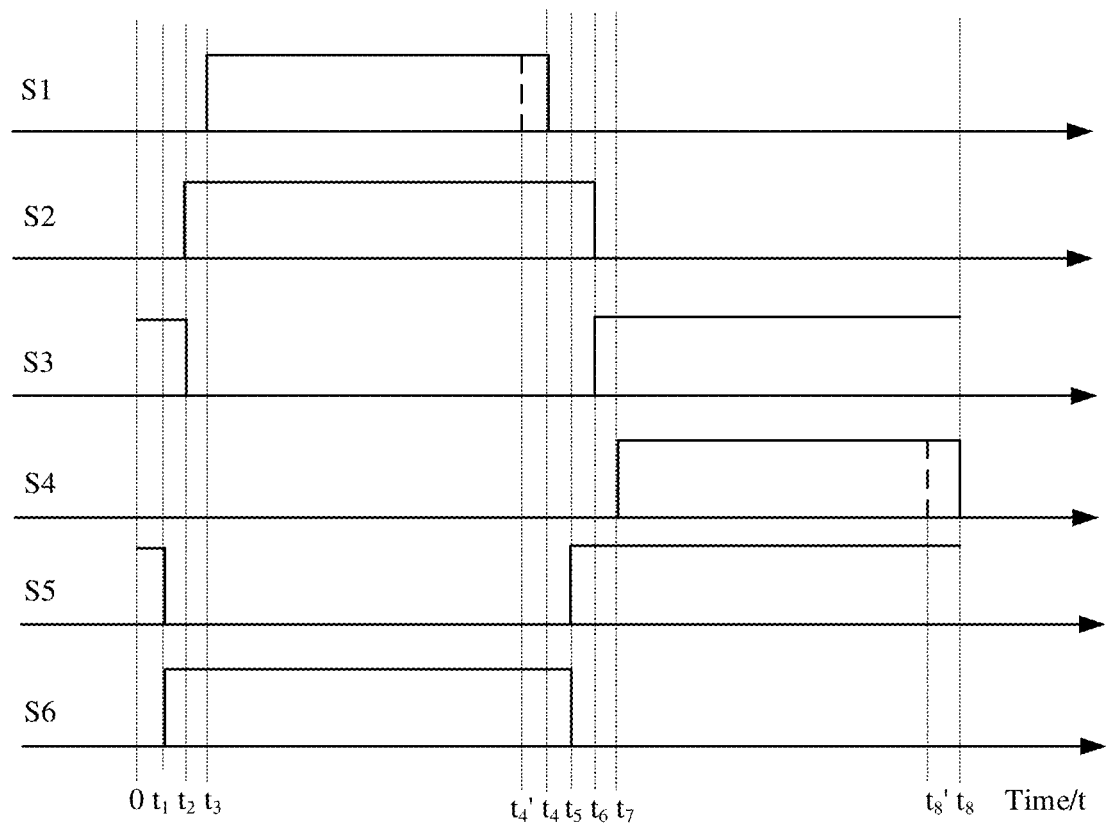
FIG. 10 shows a control time sequence of a switch in a switch unit of a main power circuit in an ANPC-type three-level RSCC.

FIG. 10 shows a control time sequence of a controller 520 for a switch in a switch unit 31 in a main power circuit 510. For the branch 30-1, in an initial state, S1, S2, S4, and S6 are in an off state, and S3 and S5 are in an on state. At a moment $t_1$, S5 is turned off, and S6 is turned on. At a moment $t_2$, S2 is turned on, and S3 is turned off. At a moment $t_3$, S1 is turned on. At a moment $t_4$, S1 is turned off. At a moment $t_5$, S5 is turned on, and S6 is turned off. At a moment $t_6$, S2 is turned off, and S3 is turned on. At a moment $t_7$, S4 is turned on. At a moment $t_8$, S4 is turned off, and the circuit returns to an initial state. Herein, $t_1$-$t_8$ may be referred to as one resonant switching period.

When S1 and S2 are turned on and S3 and S4 are turned off, a current flow direction is the BUS+ terminal, S1, S2, the resonance unit 32, D1, and the 0 terminal, the branch 30-1 is in a charging stage, and the input capacitors C1 and C2 charge the resonant capacitor Cr. When S1 and S2 are turned off and S3 and S4 are turned on, a current flow direction is the resonance unit 32, S3, S4, the 0 terminal, Cout, the BUS− terminal, and D2, the branch 30-1 is in a discharging state, and the resonant capacitor Cr is used as a power supply to charge the output capacitor Cout. In other words, the controller 520 may control an on state of the switch unit 31 in the main power circuit 510, so that any resonance unit x can obtain electric energy from the input capacitor Cin in a charging stage, and output the electric energy to the output capacitor Cout in a discharging stage.

Figure 11:
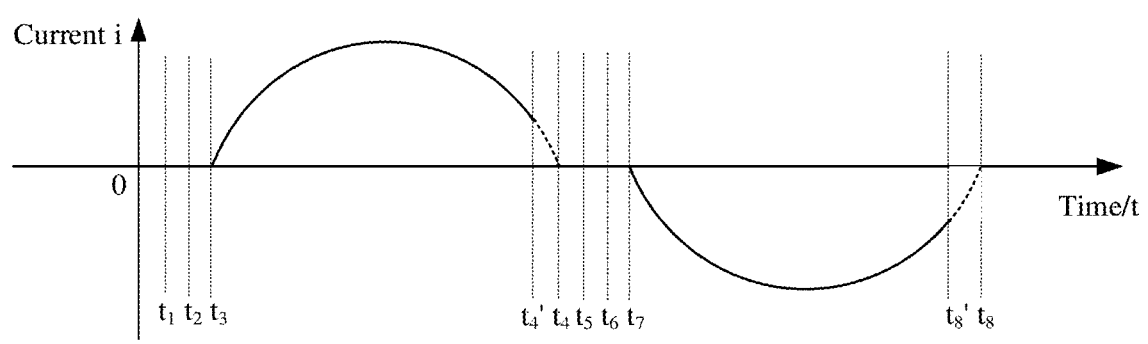
FIG. 11 is a schematic diagram of a change in an instantaneous current of a resonance unit in an ANPC-type three-level RSCC in one resonant switching period.

FIG. 11 is a schematic diagram of a change in an instantaneous current flowing through a resonance unit 32 in a branch 30-1 in one resonant switching period. It can be understood from FIG. 11 that, in the charging stage and the discharging stage, directions of instantaneous currents flowing through the resonance unit in the branch 30-1 are opposite. A length of a time period $t_3$-$t_4$ in which the switch S1 is on determines a charging time length of the resonant capacitor, and a length of a time period $t_7$-$t_8$ in which the switch S4 is on determines a discharging time length of the resonant capacitor. Therefore, S1 may also be referred to as a charging switch. When S1 is on, the branch 30-1 is in the charging stage. S4 may also be referred to as a discharging switch. When S4 is on, the branch 30-1 is in the discharging stage.

In FIG. 10 and FIG. 11, the branch 30-1 is used as an example for description. For the branch 30-2, a control time sequence of a switch in the switch unit 31 and a change in an instantaneous current of the resonance unit 32 are the same as those of the branch 30-1. However, control content of the switch units 31 of the branch 30-1 and the branch 30-2 at a same moment is not necessarily the same. At a moment, the branch 30-1 may be in the charging stage, and the branch 30-2 may be in a discharging stage.

The controller 520 may collect instantaneous currents flowing through two resonance units 32 in one resonant switching period, and determine characteristic currents of the two resonance units based on the instantaneous currents of the resonance units 32. The characteristic current may be a peak value of an instantaneous current in one resonant switching period, or may be a valid value. Further, an arithmetic average value of the characteristic currents is calculated based on the characteristic currents of the N resonance units.

The branch 30-1 is used as an example. If determining that the characteristic current of the resonance unit 32 is greater than the average value, the controller 520 may be configured to reduce a duty cycle of a control signal of the switch S1 in the branch 30-1. For example, as shown in FIG. 10 and FIG. 11, a turn-off moment of S1 may be advanced to '$t_4$', so that a time period in which the branch 30-1 is in the charging stage is reduced, and in a next resonant switching period, the characteristic current of the resonance unit 32 is reduced. Therefore, a stress and loss withstood by the switch in the switch unit 31 are reduced. If determining that the characteristic current of the resonance unit 32 is less than the average value, the controller 520 may be configured to reduce a duty cycle of a control signal of the switch S4. For example, as shown in FIG. 10 and FIG. 11, a turn-off moment of S4 may be advanced to '$t_8$', so that a time period in which a branch in which the resonance unit 32 is located is in a discharging stage is reduced, and in a next resonant switching period, the characteristic current of the resonance unit 32 is increased. Therefore, a stress and loss withstood by the switch in the switch unit 31 tend to be uniform. For other branches, a case is similar, and details are not described herein again.

Therefore, the RSCC provided can make currents of parallel branches in the RSCC uniform, so that a stress and a loss of a switch of each branch are uniform to prevent a circuit fault caused by a too high stress and loss withstood by a switch in some branches.

It should be understood that, in the embodiments, N parallel branches in an RSCC may be completely the same or may be different. In other words, RSC branches with different topologies may be connected in parallel to a main power circuit. In a possible implementation, the input capacitor of the main power circuit 210 in FIG. 2 may include two capacitors C1 and C2, a topology of an RSC branch 1 may be shown as the branch 10-1 in FIG. 3, a topology of an RSC branch 2 may be shown as the branch 20-1 in FIG. 6, and a topology of an RSC branch 3 may be shown as the branch 30 in FIG. 9. This is not limited in this embodiment.

It should be further understood that, in the embodiments, functions of the controller 220, the controller 320, the controller 420, and the controller 520 each may be separately implemented by a sampling unit and a control unit. The sampling unit may be configured to: collect instantaneous current information of instantaneous currents flowing through N resonance units in one resonant switching period, and send the instantaneous current information of the N resonance units to the control unit. The control unit may be configured to: receive the instantaneous current information of the N resonance units, determine characteristic currents of the N resonance units based on the instantaneous current information of the N resonance units, and calculate an arithmetic average value of the characteristic currents based on the characteristic currents of the N resonance units.

It should be further understood that the characteristic current is a valid value or a peak value of an instantaneous current flowing through the resonance unit in one resonant switching period, and the valid value may be calculated based on the peak value. A specific calculation manner is multiplying the peak value by a square root of 2. The average value may be obtained by dividing a sum of N valid values or peak values by a total quantity N.

The embodiments further provide a control method for a resonant switched capacitor converter. The resonant switched capacitor converter includes an input capacitor, an output capacitor, N parallel resonant switched capacitor branches, and a controller. Each of the N resonant switched capacitor branches includes a switch unit and a resonance unit. The controller may control an on state of a switch in the switch unit, so that the resonance unit obtains electric energy from the input capacitor in a charging stage, and the resonance unit outputs the electric energy to the output capacitor in a discharging stage.

The method includes: the controller determines an average value of characteristic currents of N resonance units. The N resonance units are in a one-to-one correspondence with the N resonant switched capacitor branches, and the characteristic current is a valid value or a peak value of an instantaneous current of the resonance unit in one resonant switching period. The controller reduces a duty cycle of a control signal of a charging switch in a first switch unit when determining that a characteristic current of a first resonance unit is greater than the average value. A branch corresponding to the charging switch is in a charging stage when the charging switch is turned on. Alternatively, the controller reduces a duty cycle of a control signal of a discharging switch in the first switch unit when determining that the characteristic current of the first resonance unit is less than the average value. A branch corresponding to the discharging switch is in a discharging stage when the discharging switch is turned on. The first resonance unit is any one of the N resonance units, and the first switch unit is a switch unit in a resonant switched capacitor branch in which the first resonance unit is located, where N is an integer greater than 1.

Therefore, the RSCC provided can make currents of parallel branches in the RSCC uniform, so that a stress and a loss of a switch of each branch are uniform, to prevent a circuit fault caused by a too high stress and loss withstood by a switch in some branches.

Optionally, the controller reducing a duty cycle of a control signal of a charging switch in a first switch unit when determining that a characteristic current of a first resonance unit is greater than the average value includes: the controller reduces the duty cycle of the control signal of the charging switch when determining that the characteristic current of the first resonance unit is greater than the average value and a difference between the characteristic current the first resonance unit and the average value is greater than a first threshold.

Optionally, the controller reducing a duty cycle of a control signal of a discharging switch in the first switch unit when determining that the characteristic current of the first resonance unit is less than the average value includes: the controller reduces the duty cycle of the control signal of the discharging switch when determining that the characteristic current of the first resonance unit is less than the average value and a difference between the characteristic current the first resonance unit and the average value is greater than a second threshold.

Optionally, the controller determining an average value of characteristic currents of N resonance units includes: the controller detects instantaneous currents of the N resonance units; the controller determines the characteristic currents of the N resonance units based on the instantaneous currents of the N resonance units; and the controller calculates the average value based on the characteristic currents of the N resonance units.

Optionally, the controller includes a sampling unit and a control unit, and the controller determining an average value of characteristic currents of N resonance units includes: the sampling unit collects instantaneous current information of the N resonance units, and sends the instantaneous current information of the N resonance units to the control unit; and the control unit receives the instantaneous current information of the N resonance units, and determines a valid value of each of the instantaneous currents of the N resonance units and the average value based on the instantaneous current information of the N resonance units.

Optionally, the resonant switched capacitor converter is a two-level resonant switched capacitor converter, the resonance unit includes a resonant capacitor and a resonant inductor that are connected in series, the switch unit includes a first switch and a second switch, the first switch is the charging switch, the second switch is the discharging switch, and each of the N resonant switched capacitor branches further includes a first diode and a second diode; a first terminal of the first switch is connected to a first terminal of the input capacitor, a second terminal of the first switch is connected to a first terminal of the second switch and a first terminal of the resonance unit, and a second terminal of the second switch is connected to a second terminal of the input capacitor; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

Optionally, the resonant switched capacitor converter is a neutral point clamped (NPC)-type three-level resonant switched capacitor converter, the resonance unit includes a resonant capacitor and a resonant inductor that are connected in series, the input capacitor includes a first capacitor and a second capacitor, the switch unit includes a first switch, a second switch, a third switch, and a fourth switch, the first switch is the charging switch, the fourth switch is the discharging switch, and each of the N resonant switched capacitor branches further includes a first diode, a second diode, a third diode, and a fourth diode; a first terminal of the first switch is connected to a first terminal of the first capacitor, a second terminal of the first switch is connected to a first terminal of the second switch and a cathode of the third diode, a second terminal of the second switch is connected to a first terminal of the third switch and a first terminal of the resonance unit, a second terminal of the third switch is connected to a first terminal of the fourth switch and an anode of the fourth diode, a second terminal of the fourth switch is connected to a second terminal of the second capacitor, a first terminal of the second capacitor is connected to a second terminal of the first capacitor, an anode of the third diode, and a cathode of the fourth diode; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

Optionally, the resonant switched capacitor converter is an active neutral point clamped (ANPC)-type three-level resonant switched capacitor converter, the resonance unit includes a resonant capacitor and a resonant inductor that are connected in series, the input capacitor includes a first capacitor and a second capacitor, the switch unit includes a first switch, a second switch, a third switch, a fourth switch, a fifth switch, and a sixth switch, the first switch is the charging switch, the fourth switch is the discharging switch, and each of the N resonant switched capacitor branches further includes a first diode and a second diode; a first terminal of the first switch is connected to a first terminal of the first capacitor, a second terminal of the first switch is connected to a first terminal of the second switch and a first terminal of the fifth switch, a second terminal of the second switch is connected to a first terminal of the third switch and a first terminal of the resonance unit, a second terminal of the third switch is connected to a first terminal of the fourth switch and a second terminal of the sixth switch, a second terminal of the fourth switch is connected to a second terminal of the second capacitor, and a first terminal of the second capacitor is connected to a second terminal of the first capacitor, a second terminal of the fifth switch, and a first terminal of the sixth switch; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

Figure 12:
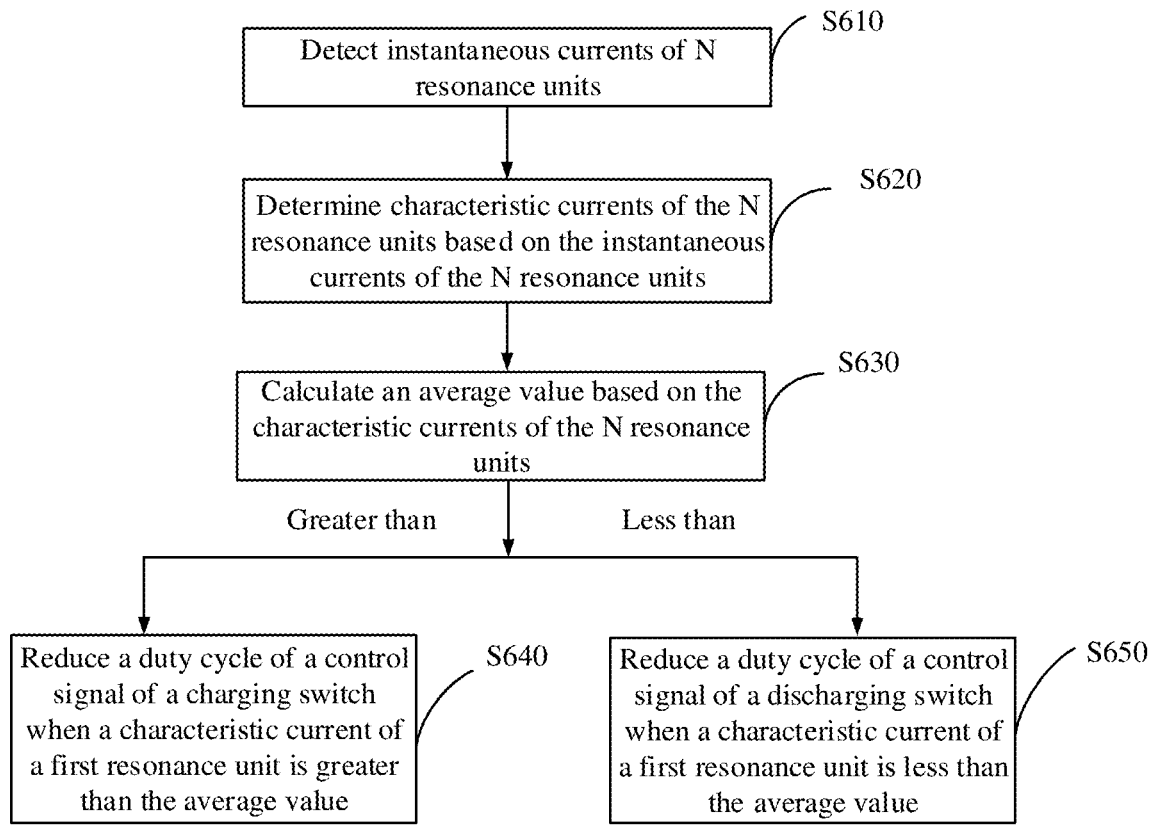
FIG. 12 is a schematic diagram of a control method for a resonant switched capacitor converter according to an embodiment.

FIG. 12 is a schematic diagram of a control method for a resonant switched capacitor converter according to the embodiments. The following describes a control method for an RSCC in the embodiments with reference to FIG. 12.

S610: Detect instantaneous currents of N resonance units.

S620: Determine characteristic currents of the N resonance units based on the instantaneous currents of the N resonance units.

S630: Calculate an average value based on the characteristic currents of the N resonance units.

S640: Reduce a duty cycle of a control signal of a charging switch in a first switch unit when determining that a characteristic current of a first resonance unit is greater than the average value, where a branch in which the charging switch is located is in a charging stage when the charging switch is turned on.

S650: Reduce a duty cycle of a control signal of a discharging switch in a first switch unit when determining that a characteristic current of a first resonance unit is less than the average value, where a branch in which the discharging switch is located is in a discharging stage when the discharging switch is turned on.

It should be understood that, for a specific implementation of each step in S610 to S650, refer to the foregoing descriptions. Details are not described herein again.

Figure 13:
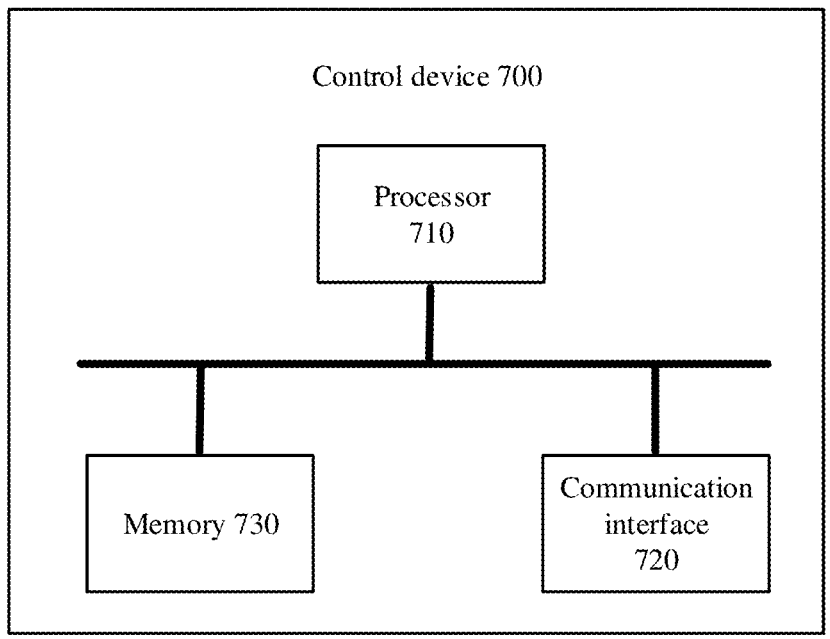
FIG. 13 is a schematic diagram of a structure of a control device according to an embodiment.

FIG. 13 is a schematic diagram of a structure of a control device 700 according to an embodiment. As shown in FIG. 7, the control device 700 includes a processor 710 and a communication interface 720. Optionally, the control device 700 may further include a memory 730. Optionally, the memory 730 may be included in the processor 710. The processor 710, the communication interface 720, and the memory 730 communicate with each other through an internal connection path. The memory 730 is configured to store instructions. The processor 710 is configured to execute the instructions stored in the memory 730, to implement the control method provided in embodiments. Optionally, the control device 700 may be configured to implement a function of a controller in FIG. 2, FIG. 3, FIG. 6, or FIG. 9, or implement a function of each control unit in FIG. 2, FIG. 3, FIG. 6, or FIG. 9.

Optionally, the embodiments further provide an MPPT combiner box, including the foregoing RSCC.

Optionally, this application further provides a power supply system, including the foregoing RSCC.

Terms such as "component", "module", and "system" indicate computer-related entities, hardware, firmware, combinations of hardware and software, software, or software being executed. For example, the component may be, but is not limited to, a process that runs on a processor, the processor, an object, an executable file, an execution thread, a program, and/or a computer. As illustrated by using figures, both a computing device and an application that runs on the computing device may be components. One or more components may reside within the process and/or the execution thread, and the component may be located on one computer and/or distributed between two or more computers. In addition, these components may be executed by various non-transitory computer-readable media that store various data structures. For example, the components may communicate by using a local and/or remote process and based on a signal having one or more data packets (for example, data from two components interacting with another component in a local system, a distributed system, and/or across a network such as the internet interacting with another system by using the signal).

A person of ordinary skill in the art may be aware that, in combination with examples described in embodiments, units and algorithm steps may be implemented by electronic hardware or a combination of computer software and electronic hardware. Whether the functions are performed by hardware or software depends on particular applications and design constraints of the solutions. A person skilled in the art may use different methods to implement the described functions for each particular application, but it should not be considered that the implementation goes beyond the scope of the embodiments.

A person skilled in the art may clearly understand that for the purpose of convenient and brief description, for a detailed working process of the foregoing system, apparatus, and unit, refer to a corresponding process in the foregoing method embodiments. Details are not described herein again.

In the several embodiments provided in the embodiments, it should be understood that the system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, mechanical, or another form.

The units described as separate parts may or may not be physically separate, and parts displayed as units may or may not be physical units, and may be located in one place, or may be distributed on a plurality of network units. Some or all of the units may be selected based on an actual requirement, to achieve the objectives of the solutions of embodiments.

In addition, functional units in embodiments may be integrated into one processing unit, each of the units may exist alone physically, or two or more units are integrated into one unit.

When the functions are implemented in a form of a software functional unit and sold or used as an independent product, the functions may be stored in a non-transitory computer-readable storage medium. Based on such an understanding, the solutions of the embodiments essentially, or the part contributing to the conventional technology, or some of the solutions may be implemented in a form of a software product. The software product is stored in a storage medium, and includes several instructions for instructing a computer device (which may be a personal computer, a server, or a network device) to perform all or some of the steps of the methods described in embodiments. The foregoing storage medium includes any medium that can store program code, for example, a USB flash drive, a removable hard disk, a read-only memory (ROM), a random access memory (RAM), a magnetic disk, or a compact disc.

The foregoing descriptions are merely specific implementations of the embodiments, but are not intended as limiting. Any variation or replacement readily figured out by a person skilled in the art within the scope in the embodiments shall fall within the scope of the embodiments.

What is claimed is:

1. A resonant switched capacitor converter, comprising:
an input capacitor and an output capacitor;
N parallel resonant switched capacitor branches, wherein each of the N resonant switched capacitor branches comprises a switch unit and a resonance unit; and a controller configured to: control an on state of a switch in the switch unit so that the resonance unit obtains electric energy from the input capacitor in a charging stage, and the resonance unit outputs the electric energy to the output capacitor in a discharging stage, determine an average value of characteristic currents of N resonance units, wherein the N resonance units are in a one-to-one correspondence with the N resonant switched capacitor branches, and the characteristic current is a valid value or a peak value of an instantaneous current of the resonance unit in one resonant switching period; and reduce a duty cycle of a control signal of a charging switch in a first switch unit when determining that a characteristic current of a first resonance unit is greater than the average value, wherein a resonant switched capacitor branch corresponding to the charging switch is in a charging stage when the charging switch is turned on; or reduce a duty cycle of a control signal of a discharging switch in a first switch unit when determining that a characteristic current of a first resonance unit is less than the average value, wherein a resonant switched capacitor branch corresponding to the discharging switch is in a discharging stage when the discharging switch is turned on, wherein the first resonance unit is any one of the N resonance units, and the first switch unit is a switch unit in a resonant switched capacitor branch in which the first resonance unit is located, wherein N is an integer greater than 1.

2. The resonant switched capacitor converter according to claim 1, wherein the controller is further configured to:

reduce the duty cycle of the control signal of the charging switch when determining that the characteristic current of the first resonance unit is greater than the average value and a difference between the characteristic current of the first resonance unit and the average value is greater than a first threshold; or reduce the duty cycle of the control signal of the discharging switch when determining that the characteristic current of the first resonance unit is less than the average value and a difference between the characteristic current of the first resonance unit and the average value is greater than a second threshold.

3. The resonant switched capacitor converter according to claim 1, wherein the controller is further configured to:

detect instantaneous currents of the N resonance units;

determine the characteristic currents of the N resonance units based on the instantaneous currents of the N resonance units; and calculate the average value based on the characteristic currents of the N resonance units.

4. The resonant switched capacitor converter according to claim 1, wherein the controller comprises a sampling unit and a control unit;

the sampling unit is configured to: collect instantaneous current information of the N resonance units, and send the instantaneous current information of the N resonance units to the control unit; and the control unit is configured to:

receive the instantaneous current information of the N resonance units;

determine the characteristic currents of the N resonance units based on the instantaneous current information of the N resonance units; and calculate the average value based on the characteristic currents of the N resonance units.

5. The resonant switched capacitor converter according to claim 1, wherein the resonant switched capacitor converter is a two-level resonant switched capacitor converter, the resonance unit comprises a resonant capacitor and a resonant inductor that are connected in series, the switch unit comprises a first switch and a second switch, the first switch is a charging switch, the second switch is a discharging switch, and each of the N resonant switched capacitor branches further comprises a first diode and a second diode;

a first terminal of the first switch is connected to a first terminal of the input capacitor, a second terminal of the first switch is connected to a first terminal of the second switch and a first terminal of the resonance unit, and a second terminal of the second switch is connected to a second terminal of the input capacitor; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

6. The resonant switched capacitor converter according to claim 1, wherein the resonant switched capacitor converter is a neutral point clamped (NPC)-type three-level resonant switched capacitor converter, the resonance unit comprises a resonant capacitor and a resonant inductor that are connected in series, the input capacitor comprises a first capacitor and a second capacitor, the switch unit comprises a first switch, a second switch, a third switch, and a fourth switch, the first switch is a charging switch, the fourth switch is a discharging switch, and each of the N resonant switched capacitor branches further comprises a first diode, a second diode, a third diode, and a fourth diode;

a first terminal of the first switch is connected to a first terminal of the first capacitor, a second terminal of the first switch is connected to a first terminal of the second switch and a cathode of the third diode, a second terminal of the second switch is connected to a first terminal of the third switch and a first terminal of the resonance unit, a second terminal of the third switch is connected to a first terminal of the fourth switch and an anode of the fourth diode, a second terminal of the fourth switch is connected to a second terminal of the second capacitor, a first terminal of the second capacitor is connected to a second terminal of the first capacitor, an anode of the third diode, and a cathode of the fourth diode; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

7. The resonant switched capacitor converter according to claim 1, wherein the resonant switched capacitor converter is an active neutral point clamped (ANPC)-type three-level resonant switched capacitor converter, the resonance unit comprises a resonant capacitor and a resonant inductor that are connected in series, the input capacitor comprises a first capacitor and a second capacitor, the switch unit comprises a first switch, a second switch, a third switch, a fourth switch, a fifth switch, and a sixth switch, the first switch is the charging switch, the fourth switch is the discharging switch, and each of the N resonant switched capacitor branches further comprises a first diode and a second diode;

a first terminal of the first switch is connected to a first terminal of the first capacitor, a second terminal of the first switch is connected to a first terminal of the second switch and a first terminal of the fifth switch, a second terminal of the second switch is connected to a first terminal of the third switch and a first terminal of the resonance unit, a second terminal of the third switch is connected to a first terminal of the fourth switch and a second terminal of the sixth switch, a second terminal of the fourth switch is connected to a second terminal of the second capacitor, and a first terminal of the second capacitor is connected to a second terminal of the first capacitor, a second terminal of the fifth switch, and a first terminal of the sixth switch; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

8. A control method for a resonant switched capacitor converter, wherein the resonant switched capacitor converter comprises:

an input capacitor and an output capacitor;

N parallel resonant switched capacitor branches, wherein each of the N resonant switched capacitor branches comprises a switch unit and a resonance unit; and a controller configured to control an on state of a switch in the switch unit, so that the resonance unit obtains electric energy from the input capacitor in a charging stage, and the resonance unit outputs the electric energy to the output capacitor in a discharging stage; and the method comprises:

determining, by the controller, an average value of characteristic currents of N resonance units, wherein the N resonance units are in a one-to-one correspondence with the N resonant switched capacitor branches, and the characteristic current is a valid value or a peak value of an instantaneous current of the resonance unit in one resonant switching period; and reducing, by the controller, a duty cycle of a control signal of a charging switch in a first switch unit when determining that a characteristic current of a first resonance unit is greater than the average value, wherein a resonant switched capacitor branch corresponding to the charging switch is in a charging stage when the charging switch is turned on; or reducing, by the controller, a duty cycle of a control signal of a discharging switch in the first switch unit when determining that the characteristic current of the first resonance unit is less than the average value, wherein a resonant switched capacitor branch corresponding to the discharging switch is in a discharging stage when the discharging switch is turned on, wherein the first resonance unit is any one of the N resonance units, and the first switch unit is a switch unit in a resonant switched capacitor branch in which the first resonance unit is located, wherein N is an integer greater than 1.

9. The control method according to claim 8, wherein reducing, by the controller, the duty cycle of a control signal of a charging switch in a first switch unit when determining that a characteristic current of a first resonance unit is greater than the average value comprises:

reducing, by the controller, the duty cycle of the control signal of the charging switch when determining that the characteristic current of the first resonance unit is greater than the average value and a difference between the characteristic current of the first resonance unit and the average value is greater than a first threshold; and reducing, by the controller, the duty cycle of a control signal of a discharging switch in the first switch unit when determining that the characteristic current of the first resonance unit is less than the average value comprises:

reducing, by the controller, the duty cycle of the control signal of the discharging switch when determining that the characteristic current of the first resonance unit is less than the average value and a difference between the characteristic current the first resonance unit and the average value is greater than a second threshold.

10. The control method according to claim 8, wherein determining, by the controller, the average value of characteristic currents of N resonance units comprises:

detecting, by the controller, instantaneous currents of the N resonance units;

determining, by the controller, the characteristic currents of the N resonance units based on the instantaneous currents of the N resonance units; and calculating, by the controller, the average value based on the characteristic currents of the N resonance units.

11. The control method according to claim 8, wherein the controller comprises a sampling unit and a control unit, and determining, by the controller, the average value of characteristic currents of N resonance units comprises:

collecting, by the sampling unit, instantaneous current information of the N resonance units, and sending the instantaneous current information of the N resonance units to the control unit; and receiving, by the control unit, the instantaneous current information of the N resonance units, and determining a valid value of each of the instantaneous currents of the N resonance units and the average value based on the instantaneous current information of the N resonance units.

12. The control method according to claim 8, wherein the resonant switched capacitor converter is a two-level resonant switched capacitor converter, the resonance unit comprises a resonant capacitor and a resonant inductor that are connected in series, the switch unit comprises a first switch and a second switch, the first switch is the charging switch, the second switch is the discharging switch, and each of the N resonant switched capacitor branches further comprises a first diode and a second diode;

a first terminal of the first switch is connected to a first terminal of the input capacitor, a second terminal of the first switch is connected to a first terminal of the second switch and a first terminal of the resonance unit, and a second terminal of the second switch is connected to a second terminal of the input capacitor; and a second terminal of the resonance unit is connected to an anode of the first diode and a cathode of the second diode, a cathode of the first diode is connected to a first terminal of the output capacitor, and an anode of the second diode is connected to a second terminal of the output capacitor.

13. The control method according to claim 8, wherein the resonant switched capacitor converter is a neutral point clamped (NPC)-type three-level resonant switched capacitor converter, the resonance unit comprises a resonant capacitor and a resonant inductor that are connected in series, the input capacitor comprises a first capacitor and a second capacitor, the switch unit comprises a first switch, a second switch, a third switch, and a fourth switch, the first switch is the charging switch, the fourth switch is the discharging switch, and each of the N resonant switched capacitor branches further comprises a first diode, a second diode, a third diode, and a fourth diode;
- a first terminal of the first switch is connected to a first terminal of the first capacitor, a second terminal of the first switch is connected to a first terminal of the second switch and a cathode of the third diode, a second terminal of the second switch is connected to a first terminal of the third switch and a first terminal of the resonance unit, a second terminal of the third switch is connected to a first terminal of the fourth switch and an anode of the fourth diode, a second terminal of the fourth switch is connected to a second terminal of the second capacitor, a first terminal of the second capacitor is connected to a second terminal of the first capacitor, an anode of the third diode, and a cathode of the fourth diode; and
- a second terminal of the resonance unit is connected to an anode of the first diode and a cathode of the second diode, a cathode of the first diode is connected to a first terminal of the output capacitor, and an anode of the second diode is connected to a second terminal of the output capacitor.

14. The control method according to claim 8, wherein the resonant switched capacitor converter is an active neutral point clamped (ANPC)-type three-level resonant switched capacitor converter, the resonance unit comprises a resonant capacitor and a resonant inductor that are connected in series, the input capacitor comprises a first capacitor and a second capacitor, the switch unit comprises a first switch, a second switch, a third switch, a fourth switch, a fifth switch, and a sixth switch, the first switch is the charging switch, the fourth switch is the discharging switch, and each of the N resonant switched capacitor branches further comprises a first diode and a second diode;
- a first terminal of the first switch is connected to a first terminal of the first capacitor, a second terminal of the first switch is connected to a first terminal of the second switch and a first terminal of the fifth switch, a second terminal of the second switch is connected to a first terminal of the third switch and a first terminal of the resonance unit, a second terminal of the third switch is connected to a first terminal of the fourth switch and a second terminal of the sixth switch, a second terminal of the fourth switch is connected to a second terminal of the second capacitor, and a first terminal of the second capacitor is connected to a second terminal of the first capacitor, a second terminal of the fifth switch, and a first terminal of the sixth switch; and
- a second terminal of the resonance unit is connected to an anode of the first diode and a cathode of the second diode, a cathode of the first diode is connected to a first terminal of the output capacitor, and an anode of the second diode is connected to a second terminal of the output capacitor.

15. A controller for a power supply system comprising a resonant switched capacitor converter comprising an input capacitor and an output capacitor, and N parallel resonant switched capacitor branches, wherein each of the N resonant switched capacitor branches comprises a switch unit and a resonance unit; the controller comprising a processor and a memory with instructions thereon, wherein the instruction upon execution by the processor, cause the processor to:
- control an on state of a switch in the switch unit so that the resonance unit obtains electric energy from the input capacitor in a charging stage, and the resonance unit outputs the electric energy to the output capacitor in a discharging stage,
- determine an average value of characteristic currents of N resonance units, wherein the N resonance units are in a one-to-one correspondence with the N resonant switched capacitor branches, and the characteristic current is a valid value or a peak value of an instantaneous current of the resonance unit in one resonant switching period; and
- reduce a duty cycle of a control signal of a charging switch in a first switch unit when determining that a characteristic current of a first resonance unit is greater than the average value, wherein a resonant switched capacitor branch corresponding to the charging switch is in a charging stage when the charging switch is turned on; or
- reduce a duty cycle of a control signal of a discharging switch in the first switch unit when determining that the characteristic current of the first resonance unit is less than the average value, wherein a resonant switched capacitor branch corresponding to the discharging switch is in a discharging stage when the discharging switch is turned on, wherein
- the first resonance unit is any one of the N resonance units, and the first switch unit is a switch unit in a resonant switched capacitor branch in which the first resonance unit is located, wherein N is an integer greater than 1.

16. The controller according to claim 15, wherein the processor is further caused to:
- reduce the duty cycle of the control signal of the charging switch when determining that the characteristic current of the first resonance unit is greater than the average value and a difference between the characteristic current of the first resonance unit and the average value is greater than a first threshold; or
- reduce the duty cycle of the control signal of the discharging switch when determining that the characteristic current of the first resonance unit is less than the average value and a difference between the characteristic current of the first resonance unit and the average value is greater than a second threshold.

17. The controller according to claim 15, wherein the processor is further caused to:
- detect instantaneous currents of the N resonance units;
- determine the characteristic currents of the N resonance units based on the instantaneous currents of the N resonance units; and
- calculate the average value based on the characteristic currents of the N resonance units.

* * * * *